US010587701B2

(12) United States Patent
Starsinic et al.

(10) Patent No.: US 10,587,701 B2
(45) Date of Patent: Mar. 10, 2020

(54) REGISTRATION MANAGEMENT IN THE SERVICE LAYER

(71) Applicant: Convida Wireless, LLC, Wilmington, DE (US)

(72) Inventors: Michael F. Starsinic, Newtown, PA (US); Dale N. Seed, Allentown, PA (US); Nicholas Podias, Brooklyn, NY (US); Quang Ly, North Wales, PA (US); Hongkun Li, Malvern, PA (US); Richard P. Gorman, Ivyland, PA (US); Zhuo Chen, Claymont, DE (US); Donald A. Fleck, Emmaus, PA (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 121 days.

(21) Appl. No.: 15/564,469

(22) PCT Filed: Apr. 11, 2016

(86) PCT No.: PCT/US2016/026932
§ 371 (c)(1),
(2) Date: Oct. 5, 2017

(87) PCT Pub. No.: WO2016/164899
PCT Pub. Date: Oct. 13, 2016

(65) Prior Publication Data
US 2018/0084064 A1 Mar. 22, 2018

Related U.S. Application Data

(60) Provisional application No. 62/145,275, filed on Apr. 9, 2015.

(51) Int. Cl.
*H04L 29/08* (2006.01)
*H04W 4/70* (2018.01)
*H04W 4/08* (2009.01)

(52) U.S. Cl.
CPC .............. *H04L 67/16* (2013.01); *H04L 67/14* (2013.01); *H04W 4/08* (2013.01); *H04W 4/70* (2018.02)

(58) Field of Classification Search
CPC ......... H04W 4/70; H04W 4/50; H04W 12/06; H04W 12/04; H04W 76/10; H04W 4/08;
(Continued)

(56) References Cited

U.S. PATENT DOCUMENTS

2005/0216380 A1* 9/2005 Morris .................... G06Q 30/04
705/34
2012/0158813 A1* 6/2012 Kumar .................. G06F 9/5055
709/201

(Continued)

OTHER PUBLICATIONS

OneM2M Technical Specification TS-0001-V1.6.1 "Functional Architecture" Jun. 30, 2015, 321 pages.

*Primary Examiner* — Djenane M Bayard
(74) *Attorney, Agent, or Firm* — BakerHostetler

(57) ABSTRACT

The present application is directed to a method for registering with a service layer. The method includes the step of forming a registration group of one or more applications. The method also includes a step of receiving a request to join the registration group, from the one or more applications based upon a review of criteria. The method also includes a step of receiving a registration preference from the one or more applications. Further, the method includes the step of performing service discovery on a network based upon the registration preference of the one or more applications in the registration group. The present application is also directed to a device for registering with a service layer. The present
(Continued)

application is further directed to a computer-implemented method for moving from a current service layer to a new service layer.

20 Claims, 17 Drawing Sheets

(58) Field of Classification Search
CPC ....... H04W 4/60; H04W 84/18; H04W 12/02;
H04W 12/08; H04W 4/00; H04W 4/023;
H04W 60/00; H04W 48/16; H04W 48/20;
H04W 4/38; H04W 84/12; H04W 88/16;
H04W 8/245; H04W 4/001; H04W 4/005;
H04W 4/02; H04W 4/06; H04W 52/0212;
H04W 52/0229; H04W 60/04; H04W
68/005; H04W 72/005; H04W 72/042;
H04W 76/14; H04W 8/08; H04L 67/12;
H04L 67/16; H04L 41/12
See application file for complete search history.

(56) References Cited

U.S. PATENT DOCUMENTS

| | | | |
|---|---|---|---|
| 2013/0188515 A1* | 7/2013 | Pinheiro | H04L 67/16 370/254 |
| 2014/0351312 A1 | 11/2014 | Lu et al. | |
| 2014/0359131 A1 | 12/2014 | Seed et al. | |
| 2015/0019717 A1 | 1/2015 | Li et al. | |
| 2015/0074144 A1* | 3/2015 | Zhang | H04W 4/70 707/770 |
| 2015/0271270 A1* | 9/2015 | Edlund | G06F 16/00 709/227 |

* cited by examiner

REGISTRATION MANAGEMENT IN THE SERVICE LAYER

CROSS-REFERENCE TO RELATED APPLICATIONS

This application is a National Stage Application filed under 35 U.S.C. 371 of International Application No. PCT/US2016/026932 filed Apr. 11, 2016, which claims priority to U.S. Provisional Application No. 62/145,275, filed Apr. 9, 2015, the disclosure of which is incorporated herein by reference in its entirety.

BACKGROUND

Generally, stand-alone applications and service layers can manage their own registration, deregistration, and discovery procedures. This may be acceptable, for example, when machine-to-machine (M2M) applications and/or M2M service layers register with an M2M service layer at power up and do not need to search for a new M2M service layer during run time. However, when different applications need to depend upon each other's service layer registration requirements, a communication disconnect occurs. The issue may further be complicated when these applications are created by different developers or companies.

There are many instances when multiple applications need to register to the same service layer or are required to register to service layers located on the same network. For example, if a device running multiple applications has only one network interface, all applications will be required to register to the service layer(s) located on the same network. Current M2M service layer standards therefore do not provide guidance how M2M service layer registration, deregistration and discovery should be initiated and coordinated.

M2M applications and M2M service layers may belong to an active, registered session but may need to search and possibly discover other M2M service layers on the same or different networks. This may be due to external events including but not limited to loss of connectivity, location change, service browsing, existence of a new service provider and when new services are required. Coordinating these search and discovery functions is presently difficult to perform. Moreover, there is currently no safe technique for moving to other networks while maintaining the existing service layer registration.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to an apparatus, system and method for managing registration of applications and service layers.

In one aspect of the application, there is described a computer-implemented method for registering with a service layer. The method includes the step of forming a registration group of one or more applications. The method also includes a step of receiving a request to join the registration group, from the one or more applications based upon a review of criteria. The method also includes a step of receiving a registration preference from the one or more applications. Further, the method includes the step of performing service discovery on a network based upon the registration preference of the one or more applications in the registration group.

According to another aspect of the application there is described a computer-implemented device including a non-transitory memory having instructions stored thereon for registering with a service layer. The device also includes a processor, operably coupled to the memory. The processor is configured to perform the instruction of forming a registration group of one or more applications. The processor is also configured to perform the instruction of receiving a registration preference from the one or more applications. The processor is further configured to perform service discovery on a network based upon the registration preference of the one or more applications in the registration group.

In yet another aspect of the application, there is described a computer-implemented method for moving from a current service layer to a new service layer. The method includes the step of providing an event trigger received from one or more applications of a registration group. The method also includes the step of determining that the event trigger has occurred. The method further includes the step of requesting a scan of available networks. Moreover, a step is described for determining whether to perform service discovery. Further, the method describes a step of requesting service discovery to be performed on a network of the available networks according to a registration preference of the one or more applications.

In even a further aspect of the application, there is described there is described a computer-implemented device including a non-transitory memory having instructions stored thereon for registering with a service layer. The device also includes a processor, operably coupled to the memory. The processor is configured to perform the instruction of providing an event trigger received from one or more applications of a registration group. The processor is also configured to perform the instruction of determining that the event trigger has occurred. The processor is further configured to request a scan of available networks. Even further, the processor is configured to request service discovery to be performed on a network of the available networks according to a registration preference of the one or more applications.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
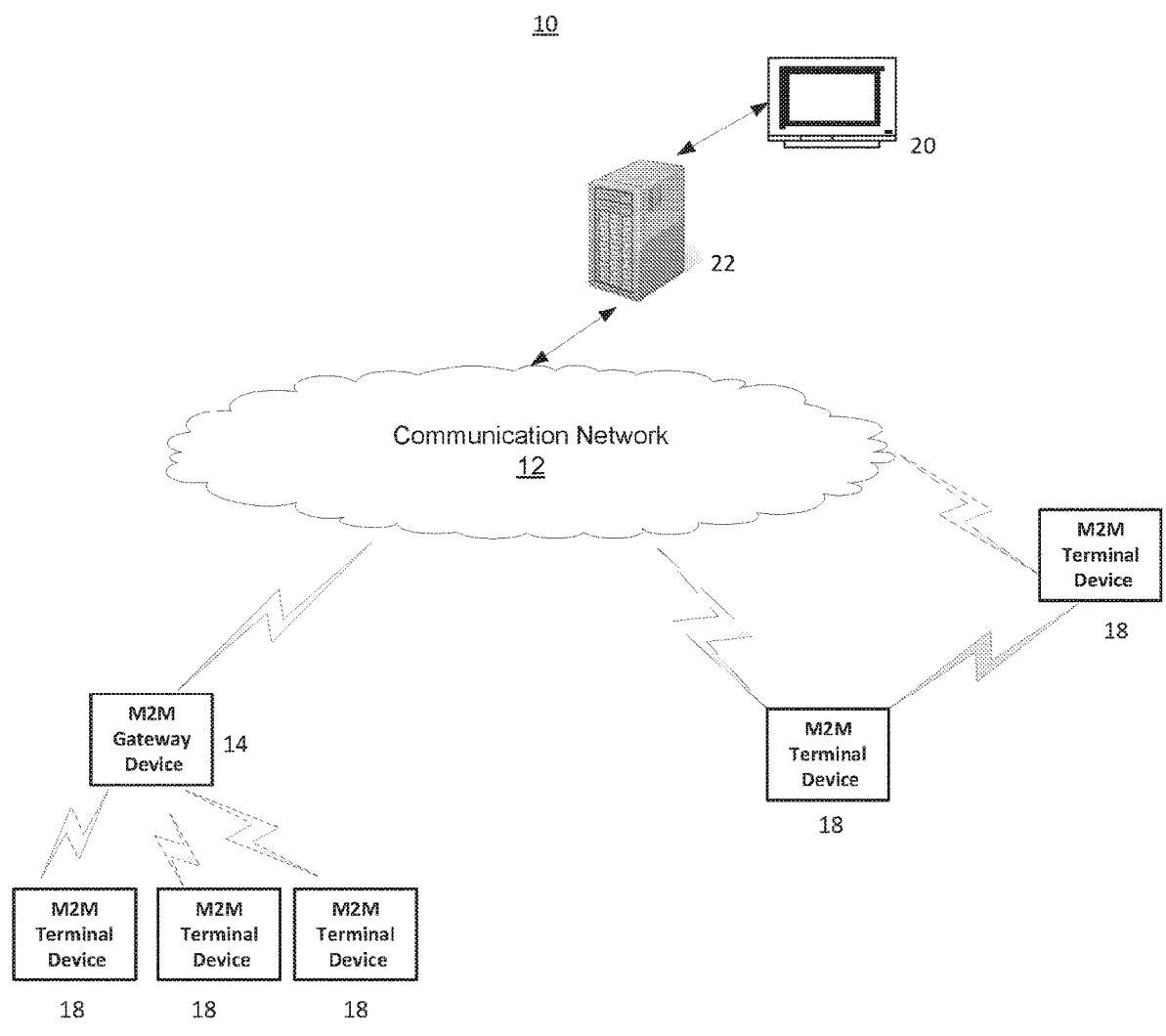
FIG. 1A illustrates an embodiment of a machine-to machine (M2M) or IoT communication system.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

According to an aspect of the present application, a novel technique and architecture are provided for a service layer that provides M2M applications and M2M service layers with a set of protocols for detecting events indicating that registration, de-registration and/or service discovery procedures may be needed and coordinating when these operations should be executed. By so doing, these methods can be leveraged by M2M applications and service layers across a diverse set of use cases and platform deployments to determine if and when to initiate deregistration, registration, and M2M service layer discovery.

In an embodiment, the M2M application or M2M service layer may be able to decide whether it wants and/or needs to de-register with the M2M service layer that it is currently registered with. According to another embodiment, the M2M application or M2M service layer may be registered to another M2M service layer and decides whether it wants to look for a more suitable M2M service layer to register with and/or detect when alternate or more suitable M2M service layers become available.

According to another embodiment, an M2M application or M2M service layer that is not registered with another M2M service layer may prefer to circumvent continuously searching for an M2M service layer. That is, it may prefer to stay in a "Not Registered" state until some pre-determined event occurs in the future. For example, the service layer may decide that it is not interested in connecting to any of the service layers that are currently available until a triggering event occurs. The triggering event may include but is not limited to a change in location, network connectivity, rate of mobility, or battery level. By so doing, battery power may be conserved due to the reduced amount of time spent searching for a service layer.

Provided below are some acronyms and their customary and ordinary definitions that will be used throughout the application.

"AE" stands for Application Entity (a oneM2M Term).

"ADN" stands for Application Dedicated Node.

"SL" stands for an ETSI M2M service layer or an oneM2M service layer

"CSE" stands for Common Services Entity. An oneM2M service layer is commonly called a CSE.

"SCL" stands for Service Capability Layer. An ETSI M2M service layer is commonly called a SCL.

"IP" stands for Internet Protocol.

"OS" stands for Operating System.

"M2M" stands for Machine-to-Machine.

"RM" stands for Registration Manager.

"TCP" stands for Transmission Control Protocol.

"TLS" stands for Transport Layer Security.

"UDP" stands for User Datagram Protocol.

"URL" stands for Uniform Resource Locator.

For example, the term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

The term "registree" refers to an application or service layer that is registered to a service layer.

The term "registrar" refers to a service layer that other service layers or applications register to.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Backbone router with a proxy, and terminal devices 18, such as LLN devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 1B:
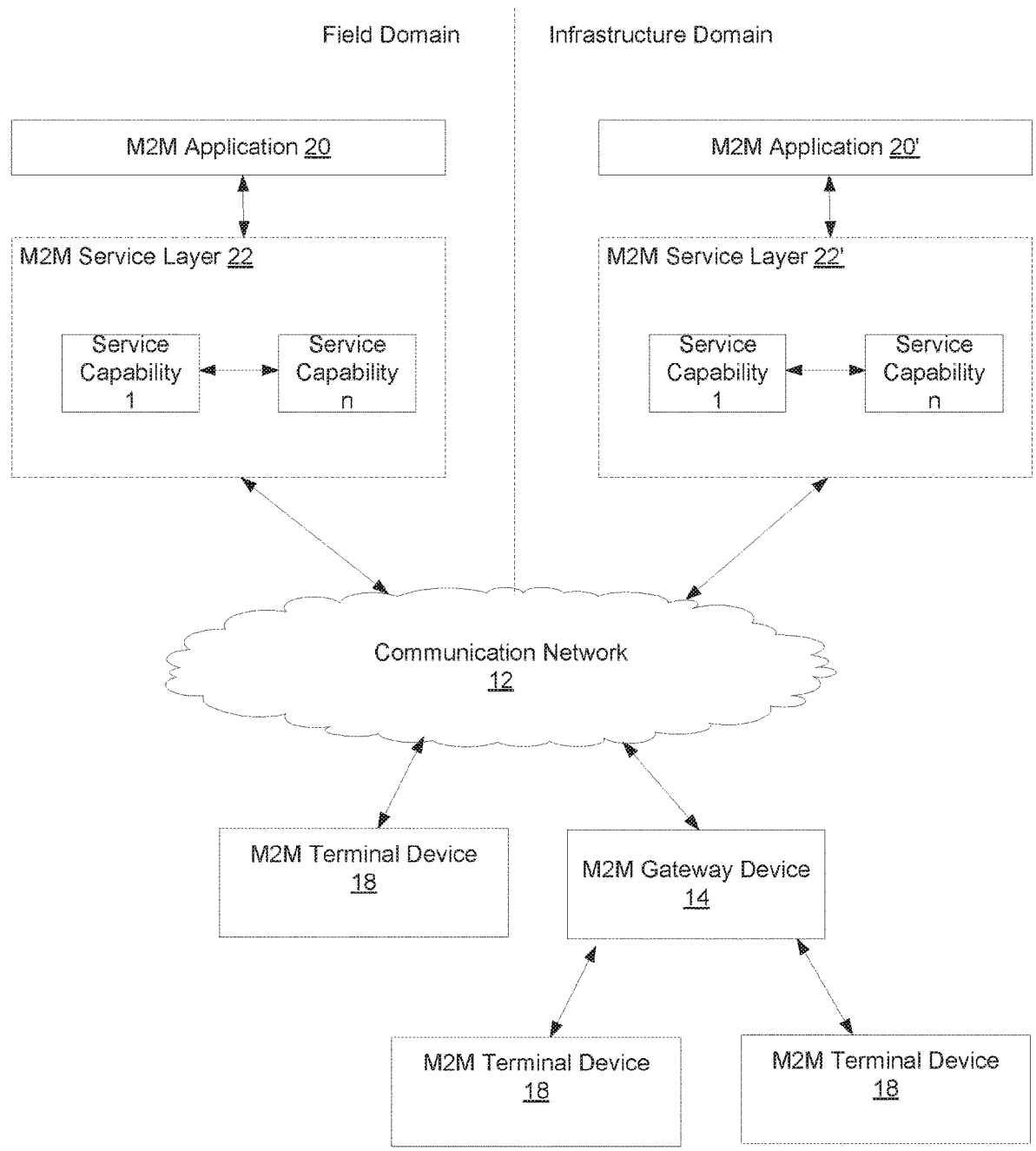
FIG. 1B illustrates an embodiment of the application of a M2M service platform.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, M2M gateway, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geo-fencing, device/service discovery, and legacy systems integration, and provides these functions as services to the M2M applications 20 and 20'. Moreover, the M2M service layer may also be configured to interface with other devices such as mobile devices and M2M servers/gateways as discussed in this application and illustrated in the figures.

According to an aspect of the application, the method of managing registration may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of searching and discovering service layers as described in the present application can be implemented as part of an M2M network that uses a Service Oriented Architecture (SOA) and/or a resource-oriented architecture (ROA) to access services related to management of discovery, registration and de-registration from a service layer.

Figure 1C:
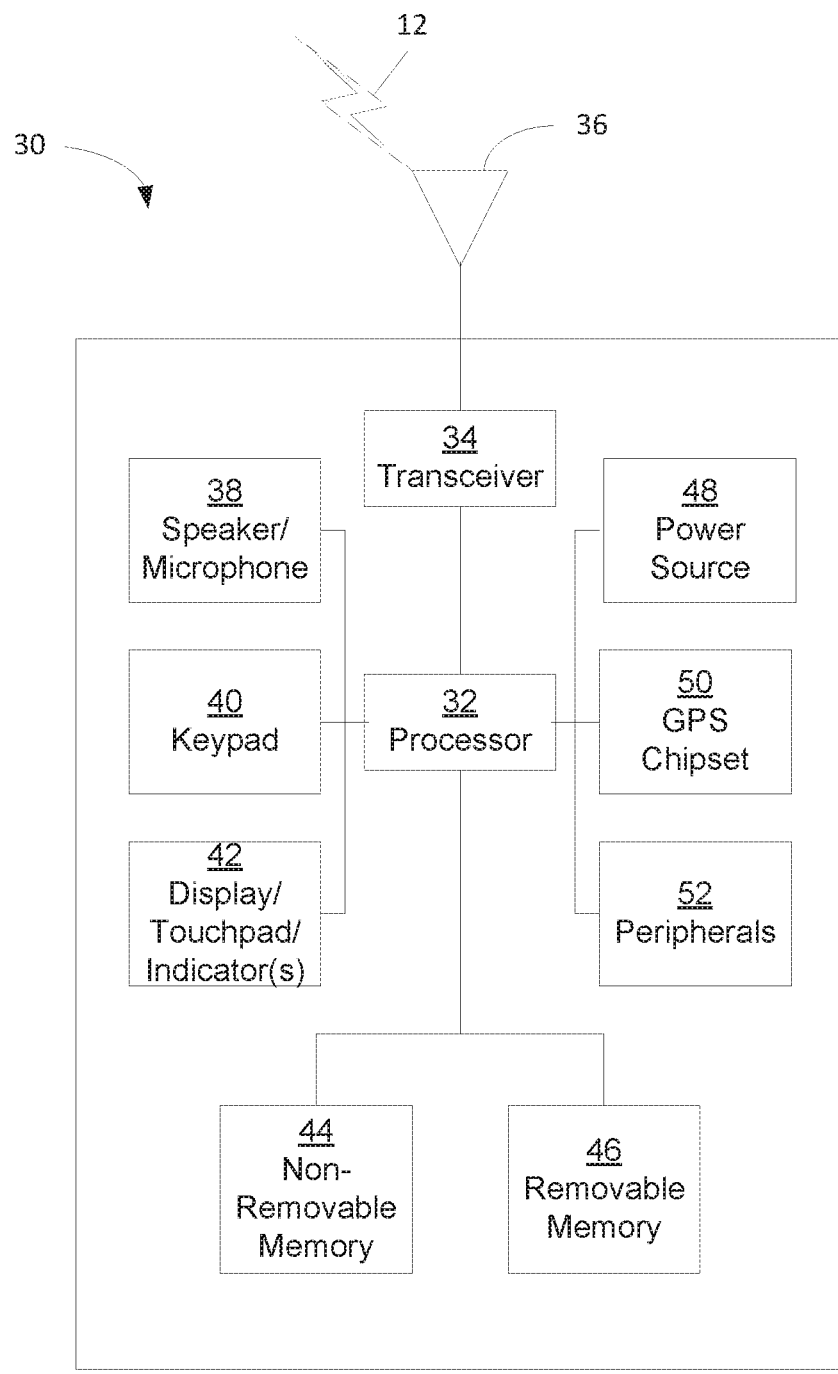
FIG. 1C illustrates an embodiment of the application of a system diagram of an example M2M device.

FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display 42 may include a graphical user interface (GUI). A GUI is described below in more detail in regards to FIGS. 8 and 9. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including for example, mobile devices as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36.

More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
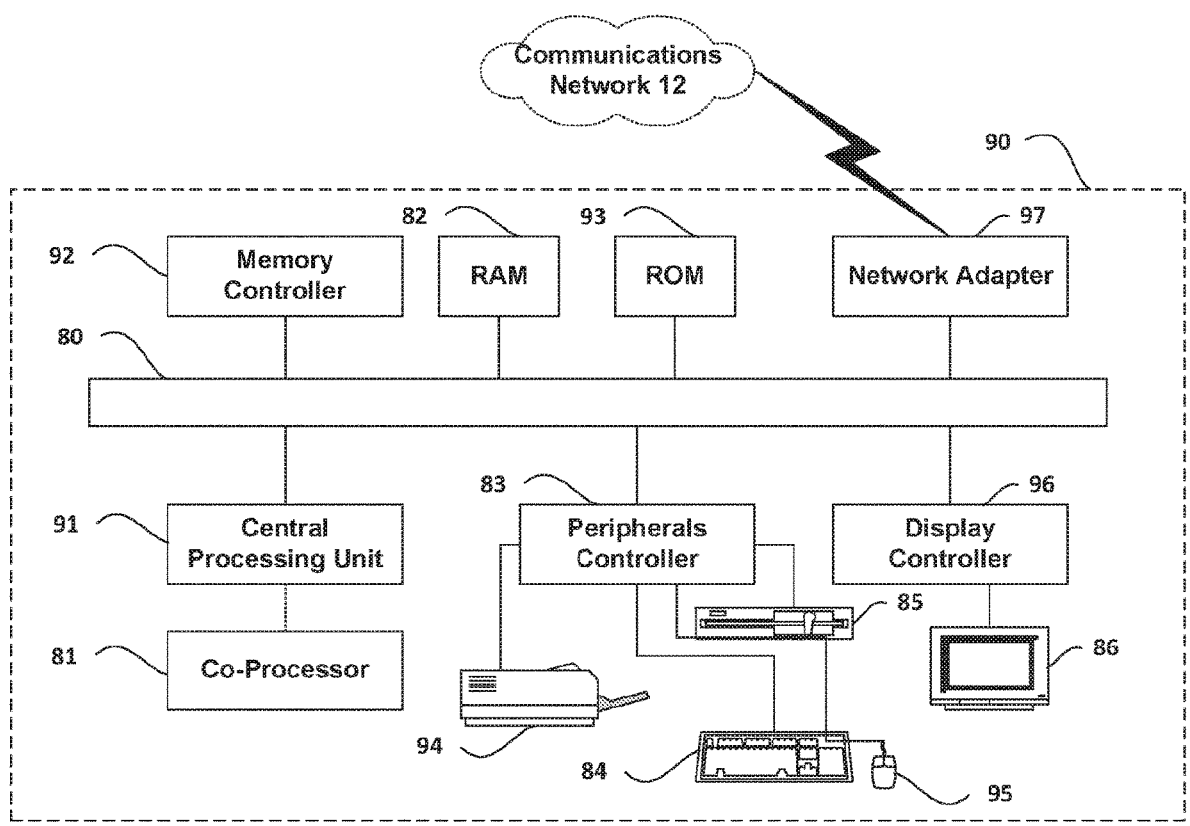
FIG. 1D illustrates an embodiment of the application of a block diagram of an exemplary computing system.

FIG. 1D is a block diagram of an exemplary computing system 90 on which, for example, the M2M service platform 22 of FIG. 1A and FIG. 1B may be implemented.

Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Transport Layer Sessions

In an embodiment, the transport layer typically provides connection-oriented services such as support for data streaming, flow control, error checking, and flow multiplexing. Here, a transport layer session refers to the IP-based data flow between an M2M application and an M2M service layer. Alternatively a transport layer session may refer to the IP-based data flow between two M2M service layers. The IP connection may be TCP-based.

A TCP-based Transport Layer Session includes a TCP connection between two transport addresses, e.g., IP Address and Port Number. The TCP-based Transport Layer Session includes but is not limited to support for reliable data transfer and congestion control. A TCP session starts when the communication peers execute a session establishment procedure which is a three-way handshake. Once the session is established, data is exchanged. Once all data has been sent, the peers will execute a process to terminate a session. A TCP session may consist of a single request and response. For example, a TCP session may consist of a single HTTP request and response. Alternatively, a TCP includes multiple requests and response. The session peers can send keep-alive messages to each other to avoid executing a new session establishment and session termination procedure for each request/response.

The Transport Layer connection may also be UDP-based. That is, it is connectionless. A UDP-based Transport Layer Session includes streams of UDP packets between two transport addresses, e.g., IP Address and Port Number. Since UDP is connectionless, the stream of UDP packets is not correlated from a UDP perspective. The UDP based Transport Layer Session is more lightweight than a TCP connection, but does not support functions such as error checking.

M2M Service Layer Session

In another embodiment, a M2M service layer session is a communication session established between a M2M service layer and either an M2M application or another M2M service layer. A service layer session uses a transport layer session to send data between a service layer and either an application or another service layer instance. The transport layer session will provide functionality such as data streaming and flow control while the service layer session provides connectivity to data, services, etc. A service layer session may establish a new transport layer session each time it needs to send a request and response. Alternatively, it may establish a session and keep the session 'alive' for multiple requests and responses.

A M2M service layer session may consist of a M2M service layer state that is related to connectivity, security, scheduling, data, context, etc. This state can be maintained by the M2M service layer, a M2M application, or both.

A M2M service layer session can be layered on top of one or more underlying lower layer communication sessions. By so doing, session state can be shared and leveraged between the different sessions, e.g., security credentials, congestion information. In addition, a M2M service layer session can support persistency with regards to lower layer sessions such that the M2M service layer session can persist and be maintained independent of lower layer sessions being setup and torn-down.

Some examples of lower layer sessions that a M2M service layer session can be layered on top of include, but are not limited to, application protocol layer sessions, e.g., HTTP session, and transport protocol layer sessions, e.g., UDP, TCP and/or TLS sessions.

M2M Service Layer Discovery, Registration and De-Registration

According to an embodiment, M2M service layer discovery refers to the process where an M2M application or an M2M service layer searches for an M2M service layer to register with. This process of discovering a service layer may be initiated at power up or due to some real-time conditions. For example, the process might be initiated because the application or service layer wants to find a service layer that offers different services. For example, when there is a location change, a user with a wearable device entering a gym may wish to find a service layer that will allow the user to interact with the gym's equipment, e.g., treadmills, for scheduling purposes.

The input to the discovery process is typically search criteria. The search criteria describe the service layer characteristics that are desired by the device. For example, the search criteria may indicate preferences, such as for example, that a service layer supporting gymnasium equipment scheduling and proximity, e.g., within 100 meters, is desired. Accordingly, the user can use this service to reserve time on a treadmill. The output of the discovery process is a list of available service layers that support this search criteria.

According to an embodiment of the present application, after service layer discovery, the M2M application or service layer will have identified an available M2M service layer whose services it wishes to use. At this point, the registration process will begin. Service layer registration is the process where an M2M application or service layer forms a relationship with another service layer so that they may use the services that are provided by the latter. In oneM2M, service layer registration involves the creation of a resource under the service layer's <cseBase> resource. In general, registration may also include authentication, authorization, and security key establishment.

In a further embodiment, the concept of "pausing" a service layer registration is employed. When an application or service layer is registered with a service layer, it is generally expected that the service layer will be able to contact its registrant. "Pausing" a registration means that the registrant informs the service layer that it will temporarily not be reachable, but the service layer should maintain any state information that it has for registrant, such as resources, security keys, temporary identifiers, etc.

According to yet another embodiment, a de-registration procedure is used by an M2M application or M2M service layer to end its relationship with the M2M service layer that it is registered to. After de-registration, the M2M application or M2M service layer is no longer able to access the services offered by the M2M service layer. In oneM2M, service layer de-registration involves the deletion of a resource under the service layer's <cseBase> resource. In general, de-registration may also include the termination, or invalidation, of a security context between the service layer and registrant.

Figure 2:
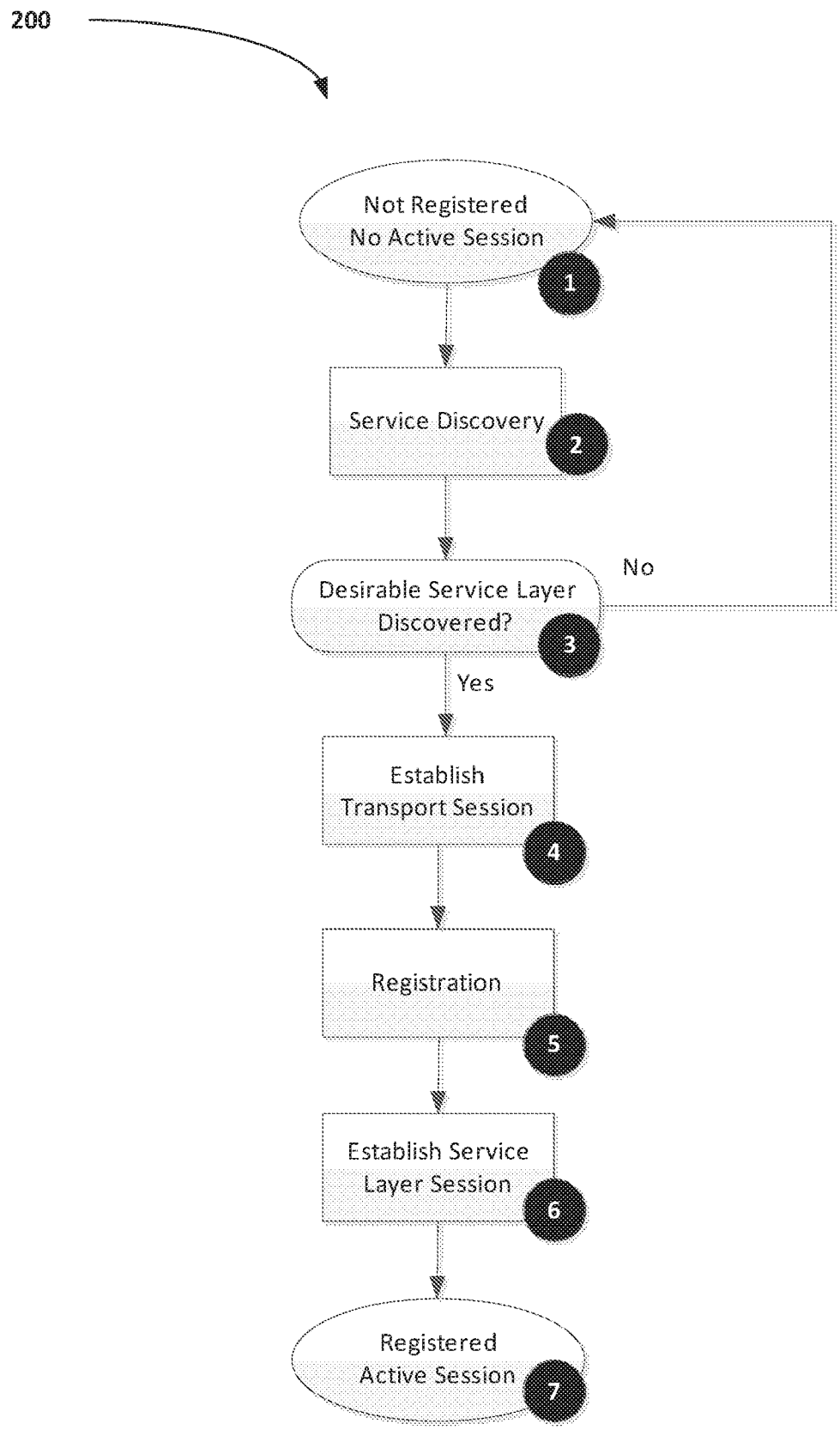
FIG. 2 illustrates an embodiment of how an M2M application or service layer connects to another M2M service layer of the present application.

In one embodiment, a connection between an M2M application or M2M service layer and another M2M service layer may require an M2M service layer discovery procedure, an M2M service layer registration procedure, a Transport Layer Session, and M2M service layer sessions. In particular, FIG. 2 shows how an M2M application or service layer connects to another M2M service layer. The steps are denoted by a numeral, e.g., 1, 2, etc. FIG. 2 shows how an M2M application or service layer might go about establishing a connection with an M2M service layer after power up. In its initial state, the M2M application or M2M service layer is not registered with another M2M service layer (Step 1)

In Step 2, the M2M application or M2M service layer executes a service discovery procedure. Here, the M2M application or M2M service layer is searching for an M2M service layer that offers the services that it requires. In Step 3, the M2M application or M2M service layer will parse the service discovery results and select an M2M service layer to register with. If no suitable M2M service layer is discovered, the M2M application or M2M service layer may decide to return to its initial state and continue the service discovery procedure. This is indicated by the return arrow from Step 3 to Step 1.

If a suitable service layer is discovered, then the information that was discovered during service discovery will be used by the M2M application or M2M service layer to establish a transport layer connection with the M2M service layer (Step 4). For example, service discovery may have supplied the URL of the selected M2M service layer. In this step, the M2M application or M2M service layer will use the URL to contact the selected M2M service layer and establish a transport connection.

In Step 5, the information that was discovered during service discovery will be used by the M2M application or M2M service layer to register with the M2M service layer. For example, service discovery may have supplied the service layer identifier of the selected M2M service layer. In this step, the M2M application or M2M service layer will use the service layer identifier of the M2M service layer to register.

Subsequent to Steps 3-5, the registration process will cause a service layer session to be established (Step 6). The M2M application or M2M service layer will begin to maintain state information about its relationship with the M2M service layer that it has registered with. According to Step 7, the M2M application or M2M service layer is now registered with an M2M service layer that offers its desired services and the M2M service layer session may be used to access the desired services.

In one embodiment, "AllJoyn" is a framework that allows devices and applications to discover and communicate with each other. AllJoyn defines a way for devices and applications to communicate with one another. For example, AllJoyn defines how devices might announce their presence and query each other to learn about applications, or features, hosted on peer devices.

Figure 3:
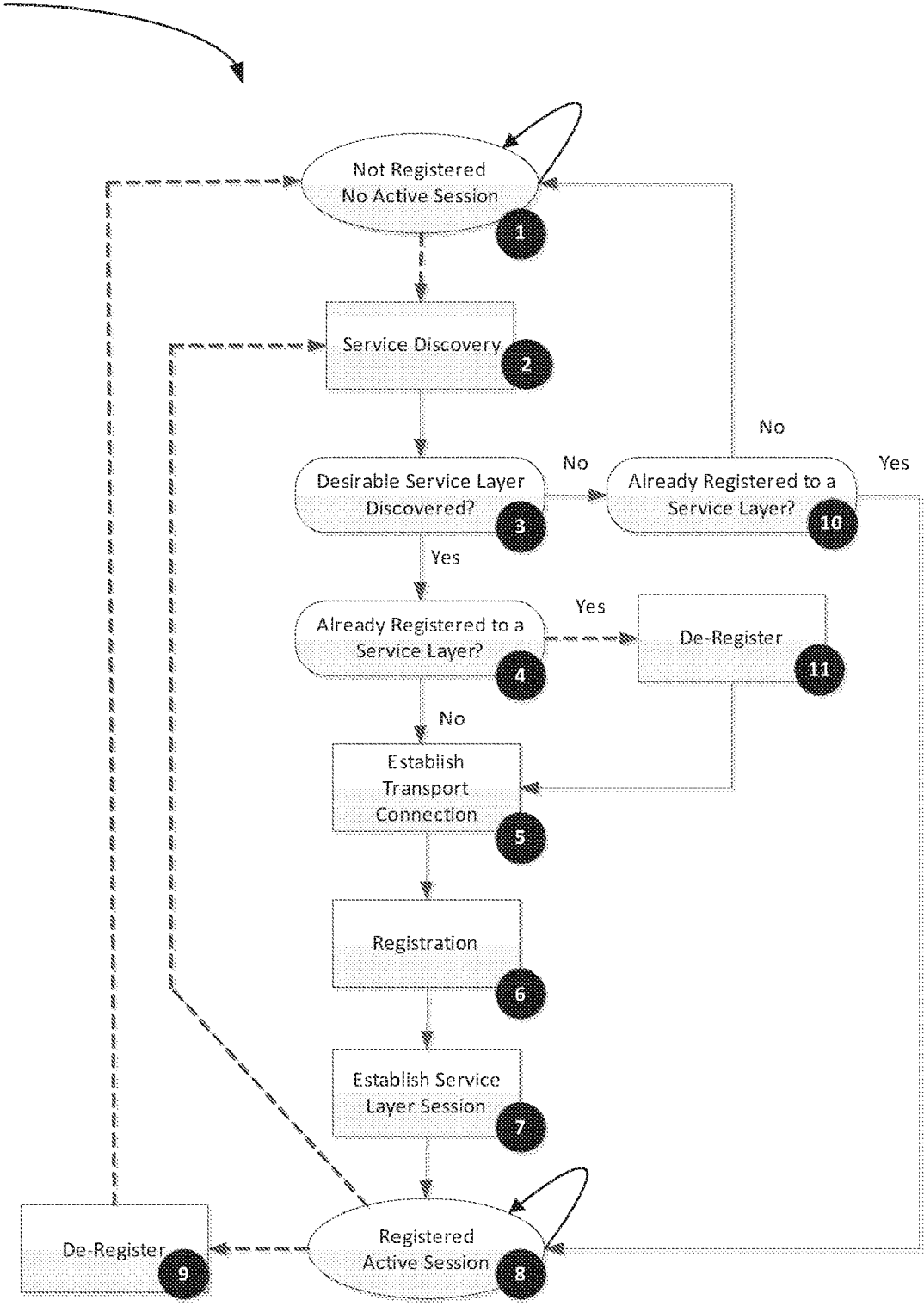
FIG. 3 illustrates an embodiment of the application for registration and deregistration of a service layer of the present application.

According to yet another embodiment, the M2M application or M2M service layer (Registree) can decide whether it wants/needs to de-register with the M2M service layer (Registrar) that it is currently registered with. This illustrated, for example, in the progression from Step 8 to 9 as shown in FIG. 3. Alternatively, an M2M application or M2M service layer (Registree) that is registered to another M2M service layer (Registrar) can decide whether it wants to look for a more suitable M2M service layer to register with and/or detect when alternate or more suitable M2M service layers become available. This is illustrated in the progression from Step 8 to Step 2 shown in FIG. 3.

An M2M application or M2M service layer (Registree) that is not registered with another M2M service layer may not want to continuously search for an M2M service layer (Registrar). It may prefer to stay in the "Not Registered" state until some event occurs. For example, if the service layer has already decided that it is not interested in connecting to any of the service layers that are currently available, then it may opt to stop searching for service layers until there is change in location, network connectivity, battery level, or rate of mobility. By reducing the amount of time spent searching, the device's resources, e.g., battery power, may be conserved. This is illustrated by the progression from Steps 1 to 2 shown in FIG. 3.

There are times when the M2M application or M2M service layer may want to remain in the de-registered state until some event occurs. For example, the application or service layer may want to remain in a sleep state until an external alarm is triggered such as a change in location, network connectivity, battery level, or rate of mobility. At this time, the M2M application or M2M service layer executes a service discovery procedure. Here, the M2M application or M2M service layer is searching for an M2M service layer that offers the services that it requires. The M2M application or M2M service layer will parse the service discovery results and select an M2M service layer to register with. If no suitable M2M service layer is discovered, the M2M application or M2M service layer will check if it is already registered with an M2M service layer.

Next, the M2M application or M2M service layer will check if it is already registered to a service layer. If it is already registered to another M2M service layer, a determination will be made whether to deregister so that it can register with the newly discovered M2M service layer.

Then, the information that was discovered during service discovery will be used by the M2M application or M2M service layer to establish a transport layer connection with the M2M service layer. For example, service discovery may have supplied the URL of the selected M2M service layer. In this step, the M2M application or M2M service layer will use the URL to contact the selected M2M service layer and establish a transport connection.

The information that was discovered during service discovery will be used by the M2M application or M2M service layer to register with the M2M service layer. For example, service discovery may have supplied the Service layer identifier of the selected M2M service layer. In this step, the M2M application or M2M service layer will use the service layer identifier of the M2M service layer to register. Once the M2M application or M2M service layer is registered, it may access the desired services.

The registration process will cause a service layer session to be established. The M2M application or M2M service layer will begin to maintain state information about its relationship with the M2M service layer that it has registered with. The M2M application or M2M service layer is now registered with an M2M service layer that offers its desired services and the M2M service layer session may be used to access the desired services. This detailed by Step 8 of FIG. 3.

While in this state, the M2M application or M2M service layer may decide that it wishes to remain registered with its M2M service layer while it searches for a more suitable M2M service layer to register with. When this decision is made, the flow will move to Step 2 as shown in FIG. 3. Alternatively, the M2M application or M2M service layer may decide that it wishes to de-register with its M2M service layer. When this decision is made, the flow will move to Step 9. Here, the M2M application or M2M service layer de-registers from the M2M service layer. The M2M application or M2M service layer may decide to remain not registered until at some point it decides to move to step 2 and begin Service Discovery. If no suitable service layer is discovered, it may check if it is already registered with an M2M service layer and returns to its steady state.

Service Layer Registration Manager (RM) Service

According to an aspect of the application, as service layer Registration Manager (RM) Service is described. This service layer RM service may be part of a larger service layer. Alternatively, the service layer RM service may be a stand-alone service that selects a service layer on behalf of other service layers and applications.

In an embodiment, the service layer RM will be responsible for coordinating the following actions: discovery, registering, and de-registering. For example, when applications or service layers are not registered to any other service layer, the service layer RM will decide if, and when, there should be an attempt to discover and/or register with another service layer. In another example, when applications or service layers are registered to another service layer, the service layer RM will decide when, and if, to deregister from the service layer. In yet another embodiment, the service layer RM will decide when, and if, to search for another service layer to register with.

The service layer RM manages applications and service layers in registration groups. A registration group may include one or more applications and service layers. All members of the registration group will be registered to the same service layer(s). The service layer RM is responsible for finding a service layer for the group to register to. In a further embodiment, the service layer RM is also responsible for commanding, or requesting, the group members to register with the service layer.

Figure 4:
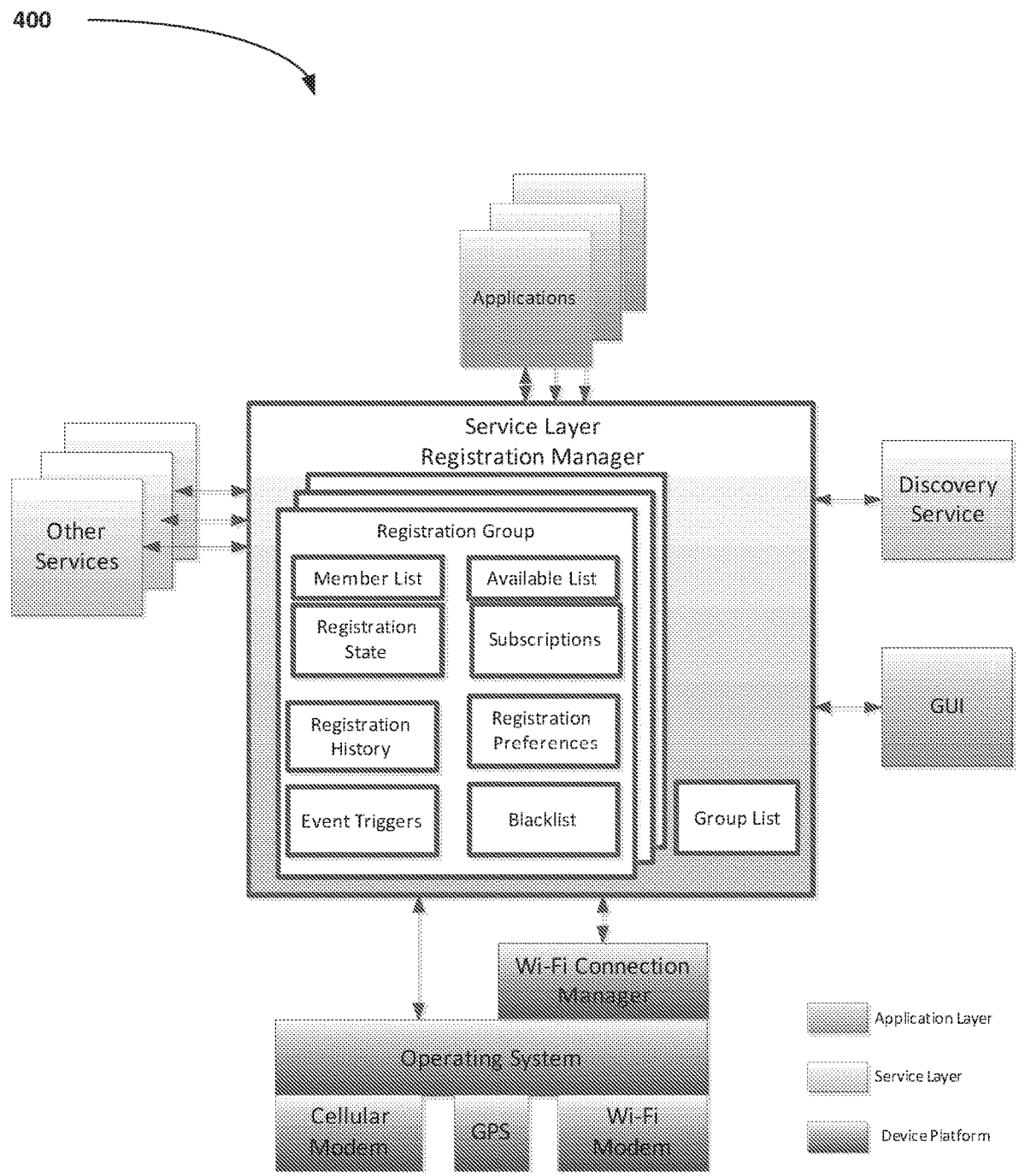
FIG. 4 illustrates an embodiment of an exemplary platform of the present application.

In another embodiment, the service layer RM and its relationship to the rest of an exemplary device platform 400 are shown in more detail in FIG. 4. Here, the service layer RM 410 is a service that interfaces to other services 415, applications 420, a GUI 430, and the host platform 440, including the OS 440a and Wi-Fi Connection Manager 440b. The host platform 440 may also include a cellular modem 440c, Wi-Fi modem 440e and GPS Chipset 440d. The service layer 410 may include a registration group 410 which may include but is not limited to stored information or data such as: member list, registration state, registration history, event triggers, available list, subscription registration preferences and a blacklist. In one embodiment, the RM 410 may be hosted on the same physical device as other services and applications or may be hosted on a different device. According to one example, the RM resides on a device with multiple applications 420 and a discovery service 450. The RM 410 and discovery service 450 may be used to discover remote service layers that the applications 420 can register with. Alternatively, the RM functionality may be integrated with the Service Discovery function.

Figure 5:
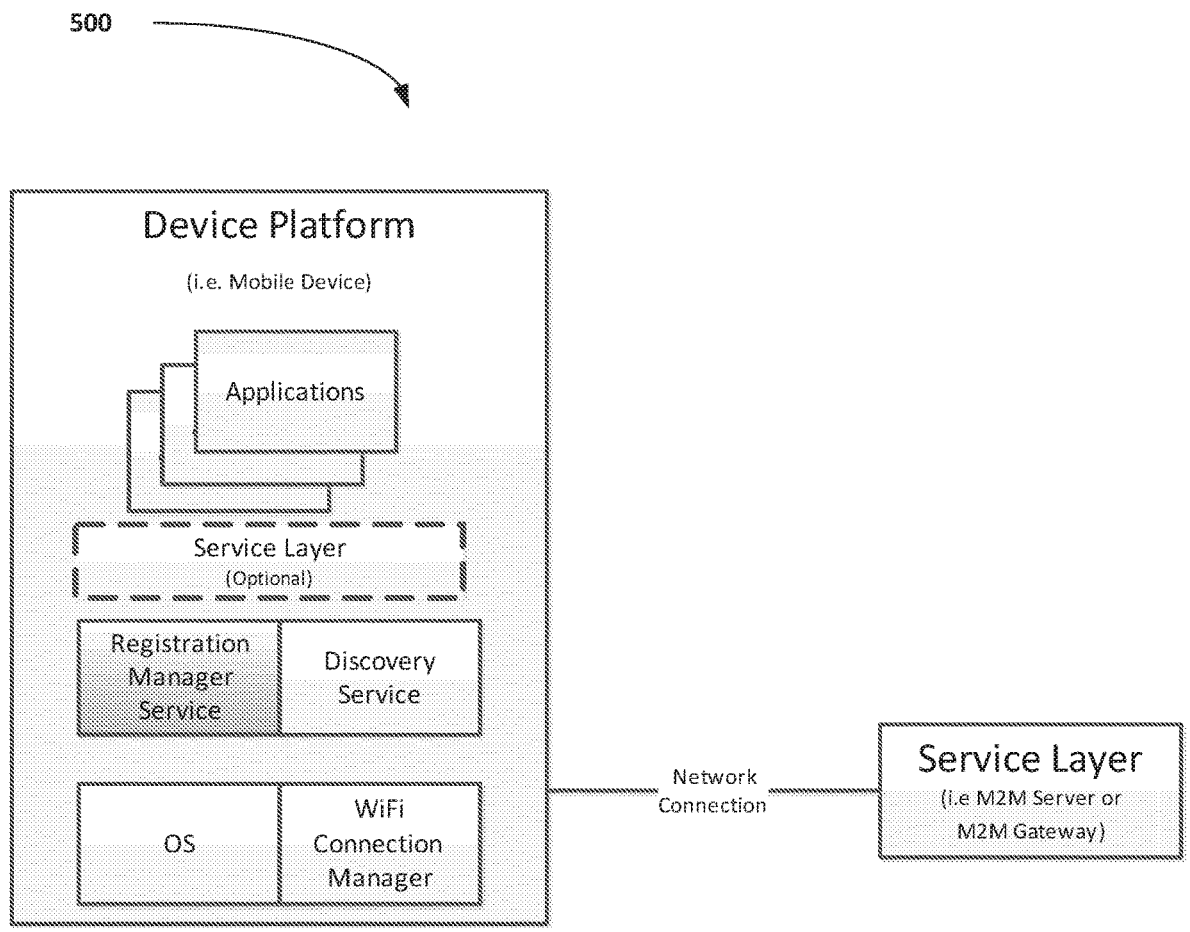
FIG. 5 illustrates another embodiment of a device platform of the present application

In one embodiment, the RM service 410 is hosted locally on a device 400 with the application(s) 420 that it manages as illustrated in the system 500 of FIG. 5. The applications on the device use the RM and discovery service to find a service layer that is hosted on some remote device 510 such as a gateway. In a preferred embodiment, the device 400 may be a mobile phone, such as for example, a smart phone that uses the RM service to find a service layer that is hosted on a remote device 510 such as a Wi-Fi router 510.

Figure 6:
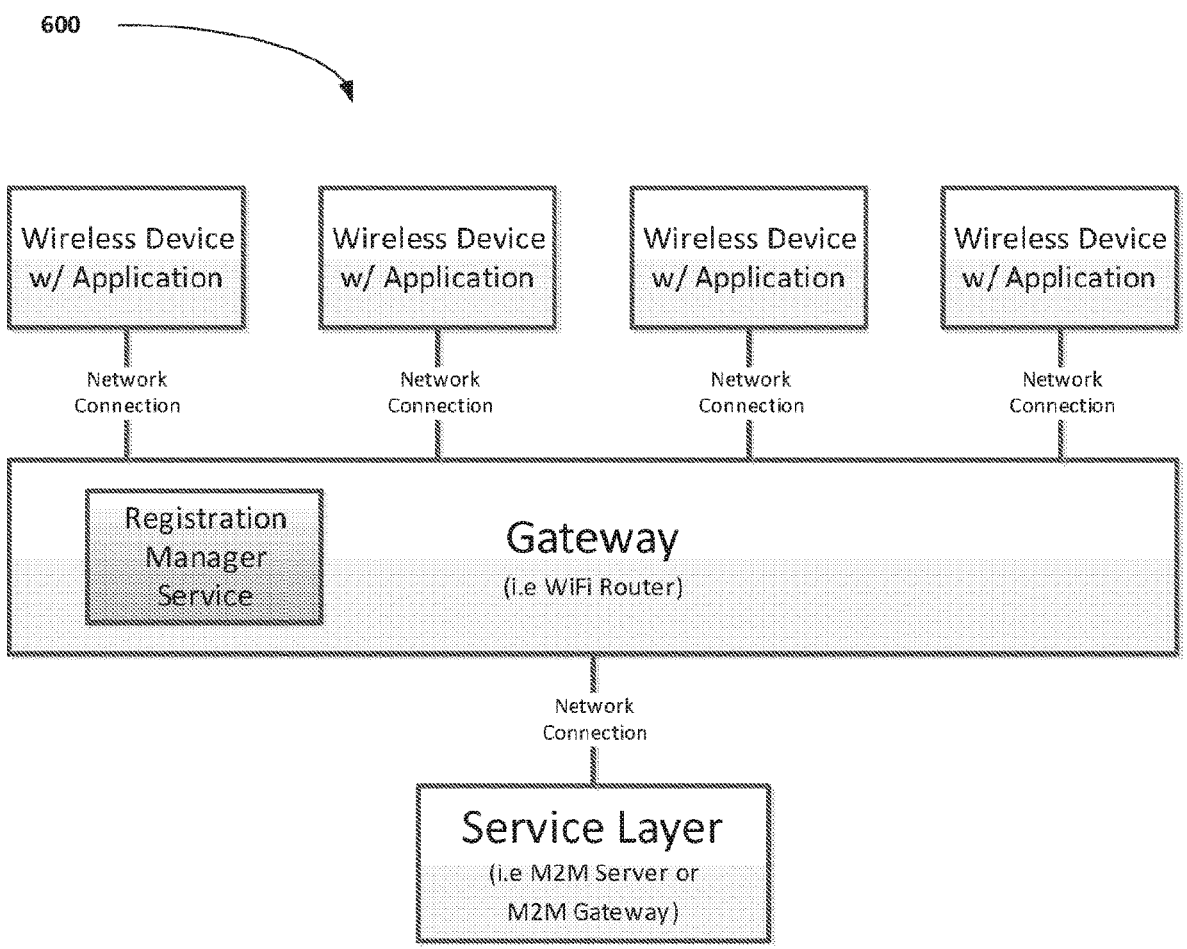
FIG. 6 illustrates yet another embodiment of a device platform of the present application.

In yet another embodiment, the RM service 410 is hosted remotely on a gateway 610 as shown in the system 600 of FIG. 6. That is, the RM service 410 is hosted on a separate platform than the application(s) 420 that it manages. The applications 420 on the device 400 are provisioned with contact information for the remote RM service 410. The applications 420 may use the RM service 410 to find a service layer 510 that is also hosted on remote device. In one example, a smart appliance may use an RM service 410 that is hosted on an M2M gateway 610 to find a service layer that is hosted on a remote M2M server.

Registration Groups

A registration group is a group of applications and/or service layers that are to be registered to the same service layer(s). This is illustrated, for example, in FIG. 4. The group members may or may not reside on the same device. The RM maintains a membership list for each registration group. For example, if the RM resides in a server that is remote from the group members, the group members do not need to maintain a membership list. The membership list holds the application identifiers and service layer identifiers that are associated with the group.

A set of registration preferences is maintained for each registration group. Service layers and applications that are part of the group may be permitted to provide registration preferences. The registration preferences are a set of requirements for any service layer that the group registers to. Each of the group members can put requirements in the preferences list. A group member can only modify their own preferences and the RM will create a set of aggregate preferences for the group. Table 1 below shows a list of registration preferences that may be created by a single group member. The RM will consider the aggregate preferences of all group members when searching for and selecting a service layer. According to a further embodiment, the particular values of the list may be ranked so that the RM knows which preferences take priority over others.

TABLE 1

| | |
|---|---|
| Service layer Names | Specific names of service layers. A required/preferred indication will be provided with list of names. |
| Service layer Owner | Specific names of service layer owners (Service Providers). A required/preferred indication will be provided with list of names. |
| Network Name | Specific names of networks. A required/preferred indication will be provided with list of names. |
| Network Owner | Specific names of network operators. A required/preferred indication will be provided with list of names. |
| Registration Cost | A specific cost limit. The cost may be expressed in terms of monetary units, data plan credits, etc. A required/preferred indication will be provided with the cost limit. |
| Desired Services | A list of desired services types. A required/preferred indication will be provided with each service type. In order to indicate that particular service type is only required when the user is in a particular location, a location may be associated with each required service type. In order to indicate when, or how often, a particular service will be used, a usage schedule may be included. The schedule may indicate at what times and/or what days the service is needed. |
| Security Requirements | The service layer protocols that are required by the group member. |
| Communication Protocols | The communication protocols that are required by the Service layer, e.g., CoAP, HTTP, etc. |

The RM will consider the collective preferences of the group when selecting a service layer and also when initiating a new service discovery procedure. For example, one group member application may indicate that it requires a location tracking service while another group member application may indicate that it requires a data storage service. The RM will use the service discovery procedure to search for service layers that provide both a location tracking service and a data storage service.

The registration preferences for a group may be used as an input to the service discovery procedure. The result of the service discovery procedure will be used to build an Available List for the group. The group's available list includes all service layers that fulfill the registration preferences. An example entry in the available list is shown in Table 2. In a further embodiment, if and when a service layer or application is required to register with more than one service layer, it could belong to one or more registration groups. Each registration group may then be used to manage the separate registrations.

TABLE 2

| | |
|---|---|
| Service layer Name | The service layer's identifier (IP address/port, FQDN, DNS, etc.) |
| Service layer Owner | The owner of the service layer (Service Provider). |
| Network Name | The network that can be used to reach the service layer |
| Network Owner | The network operator that owns the network that can be used to reach the service layer |
| Registration Cost | The monetary cost of connecting to the service layer |
| Available Services | The services that are offered by the service layer. |
| Security Protocols | The security protocols that are supported by the Service layer |
| Communication Protocols | The communication protocols that are supported by the service layer (i.e. CoAP, HTTP, etc.). |

The RM is configured to simultaneously manage multiple registration groups. That is, it may maintain multiple sets of registration preferences and available lists. In order to minimize the number of times that service discovery is executed, the RM may choose not to pass a single group's registration preferences to the discovery procedure or it may choose simply to give the service discovery procedure a paired down set of preferences. Once the discovery results are obtained by the RM, the RM can pair down the results based on the registration preferences of each group and create a separate an Available list for each group.

The RM will maintain a Blacklist for each group. The Blacklist will enumerate service layers that have been deemed unsuitable for the group. If a service layer (registrar) commands a service layer or application (registree) to deregister, then the registrar may force the de-registration operation by adding the service layer (registrar) to the blacklist.

In another embodiment, a set of subscriptions will be maintained for each registration group. Generally, subscriptions are notifications about occurrences in the group. A group member may create a subscription within the group. Examples of subscriptions include but are not limited to the following: (i) a member can subscribe/request to be notified whenever a registration is required; (ii) a member can subscribe to be notified whenever a de-registration is required; (iii) a member can subscribe to be notified whenever the Available list is updated; and (iv) a member can subscribe to be notified whenever the Available list is updated with a service layer that matches some criteria.

In a yet another embodiment, a set of Event Triggers will be maintained for each Registration Group. Each trigger describes an event that should cause some RM action. Table 3 lists possible events and actions. Each group member may be configured to include one or more triggers. In one example, group members may only remove a trigger if they created the trigger. Alternatively, any group member may remove a trigger created for the group.

TABLE 3

| Registration Related Event | Possible RM Action |
|---|---|
| Updated Registration Preferences | De-Register Select a new Service layer from the Available List Initiate a new Service Discovery procedure |
| Service Discovery Completion | De-Register Select a new Service layer from the Available List Initiate a new Service Discovery procedure |
| Updated Available List | Select a new Service layer from the Available List |
| New Service layer Selected | De-Register |
| De-Registration | Select a new Service layer from the Available List Initiate a new Service Discovery procedure |
| New Event Trigger | The creation of a new event trigger may generate a trigger to the other group members. |

The RM maintains a registration state for each registration group. The registration state is used to track whether a service layer or application is registered, not registered, actively searching for a new service layer, etc. In addition, the RM maintains a Registration History for each registration group. The Registration History is a list of Service layers that the group previously registered to. The history may be customizable for any period of time. The history also includes the network name, i.e., SSID, used to connect to the service layer.

At times, conflicts among group members based upon their requirements may occur. In these cases, the RM may need to create multiple groups. Creating separate, multiple groups allows group members to register to different service layers. For example, one group member, e.g., OneM2M application or Service layer, may wish to connect to a home automation service layer while another group member may wish to connect to a gymnasium service layer.

Registration Group States

Figure 7:
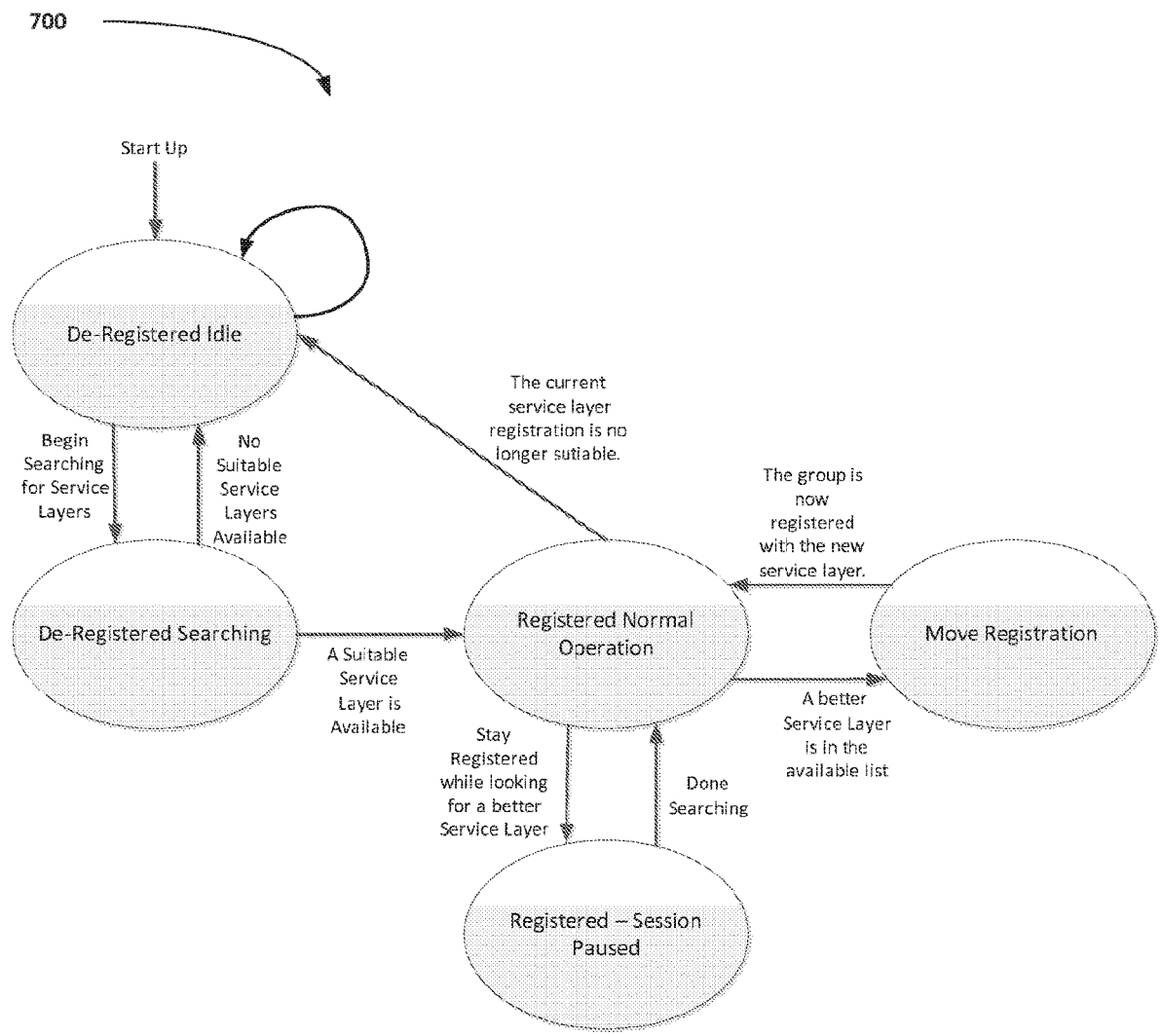
FIG. 7 illustrates a flow diagram of the registration process according to the present application.

According to another embodiment, as illustrated in the flow chart 700 of FIG. 7, the RM maintains a registration state for each registration group. The possible registration states are listed in Table 4. These include de-registered—idle, de-registered—searching, registered—normal operation, registered—session pause, and move registration. If the RM is able to simultaneously manage multiple groups, then it may be efficient to architect the software such that a separate thread of execution is used to manage each group. Each thread may maintain a separate state.

TABLE 4

| State | Description |
|---|---|
| De-Registered-Idle | The group is not registered to any service layer and not waiting for the result of a service discovery operation. |
| De-Registered-Searching | The group is not registered to any service layer, but it is waiting for the result of a service discovery operation. |
| Registered-Normal Operation | The group is registered to another service layer. |
| Registered-Session Pause | The group is registered to another service layer, but the session is paused so that the RM may perform service discovery on other networks. This state is only needed when the RM and Service Discovery services are hosted on the same platform as the registration group members that they are servicing. |
| Move Registration | The group is de-registered from the service layer and is in the process of registering to a more suitable service layer. |

In the De-Registered—Idle state 710, the RM is not waiting for the result of a service discovery procedure. It is not actively searching for a service layer to register with. The following events may cause the RM to leave the De-Registered—Idle State and move to the De-Register—Searching state. One event may be when a timer expires. This indicates that a a Service layer Discovery procedure should be initiated. A second event may be when a Service layer or OneM2M application asks the RM to seek a Service layer to register with. A third event may be when a Service layer or OneM2M application updates the RM's registration preferences. Another event may be when a Device Trigger has been received. Yet another event may be when the GUI sends a message to the RM indicating that a Service layer Discovery procedure should be initiated.

Yet another event may be an indication from the modem platform to the RM causing the Service layer Discovery procedure to be initiated. For example, the OS may indicate that a new network, i.e., Wi-Fi SSID or cellular Network, has come within range. The OS may indicate that the device has entered or exited some geographical area. The OS may indicate that some context has changed or has been detected. For example, a motion sensor on the platform may indicate that the user seems to be running or rate of movement has changed.

In the De-Registered—Searching State 720, the RM will initiate one or more Service layer Discovery procedures. When the procedures are complete, the available list will be updated and the state will move to the state, "De-Registered—Idle" or "Registered—Normal Operation". The RM will select the next state according to the following methodology. If one or more of the discovered service layers matches the criteria that are enumerated in the Registration Preferences, then the RM will initiate registration with a selected service layer by sending a message to each group member notifying them that they should register with the selected service layer. Once each group member notifies the RM that it has registered with the selected service layer, the RM will move to the "Registered—Normal Operation" state.

However if a group member indicates that it cannot register with the selected service layer, then the RM will move to the "De-Registered—Idle" state. Moreover, if none of the discovered service layers matches the criteria enumerated in the Registration Preferences, then the RM will enter the De-Registered Idle state. As discussed above, the RM may form multiple, separate groups, if necessary, depending upon the requirements of each group member.

In a further embodiment, multiple Service layer Discovery procedures may be initiated while in the De-Registered—Searching State. The RM may decide to execute the Discovery Procedure over multiple networks. For example, the Discovery Procedure may be done on one or more cellular and Wi-Fi networks. Alternatively, the RM could request that the OS of its host device connect to different networks via the Wi-Fi or cellular interface and perform the service discovery procedure on each interface. For example, the RM could request that the device connect to an SSID so that the discovery procedure may be run and then connect to another SSID so that the discovery procedure may be re-run.

A third state is called the "Registered—Normal Operation" state 730. In this state, the group is registered to a service layer(s) and the services of the service layer(s) are being utilized. The RM may leave the "Registered—Normal Operation" state for the following reasons. One reason may be that the RM enters the "Registered—Session Paused" state. This state is entered into if it is required to, either via event triggers or preferences, to search other networks having a suitable service layer. Alternatively, the RM will deregister from the current service layer and enter the Move Registration state if a more suitable service layer is discovered. This step may entail migrating the current service layer session to the new service layer. Another reason may be that the RM will deregister from the current service layer and enter the "De-Registered—Idle" state if it is determined that the currently registered service layer is no longer suitable. It is noted that if the discovery service and registration groups are hosted on the same device, then the service discovery procedure may only be executed on the same network as the current Service layer while the device is in the Registered—Normal Operation state.

The fourth state is called the Registered—Session Paused State 740. The "Registered—Session Paused" state is useful for the case where the RM, discovery service, and registration group(s) are hosted on the same device, because it may be necessary for the device platform to connect to other networks in order to perform service discovery. This type of deployment is shown, for example, in FIG. 5. In the Registered—Session Paused state 740, the current service layer session is paused so that the device can connect to other networks, perform service discovery, and update the Available List. When all of the discovery procedures are complete, the RM will move back to the "Registered—Normal Operation" state.

Pausing a session entails telling the group members that they should not attempt to contact the service layer at this time due to a temporary connection to other networks. The application or service layer may inform the service layer before pausing its session so that the service layer is aware of its state. In an embodiment, the application or service layer may be required to periodically resume and refresh its service layer session in order to keep it from being forcibly ended by the service layer.

Next, the RM will return to the "Registered—Normal Operation" state 730 when it is done searching for service layers and updating the group's available list. If there are many networks for the RM to search, then the RM may be required to periodically return the "Registered—Normal Operation" state 730 so that the current Service layer registration can be refreshed before its lifetime expires.

Further, the Move Registration state 750 is used when a new Service layer has been discovered and the RM has requested that the group de-registered from the old service layer. The RM will move back to the Registered—Normal Operation state when the new registration is complete.

Registration Manager Interfaces

According to another embodiment, the RM includes 4 general types of interfaces. One interface is where the RM provides an API that is used to interface to Applications and Service layers that are part of a registration group(s). Another interface is where the RM interfaces to a Service Discovery Process. A third interface is where the RM has many interfaces to the physical platform that it runs on, including interfaces to the platform OS. A fourth interface is where the RM provides an API that is used to interface to a GUI.

Registration Manager API

Table 5 provided below lists the API's that are available to the Applications and Service layer's that utilize the Registration Manager. The following sub-sections describe each API in more detail. The API's are procedural in nature and could be mapped to a protocol such as REST, HTTP, CoAP, etc. Mappings to other protocols would be used in a deployment such as the one shown in FIG. 6 where the RM is hosted remotely.

TABLE 5

| Function | Description |
| --- | --- |
| API's Initiated by an Application or Service layer | |
| RMCreateGroup( ) | Creates a new Registration Group |
| RMReadGroupList( ) | Read the list of existing Registration Group Names |
| RMReadGroupConfig( ) | Read the configuration details of an existing Registration Group. |
| RMJoinGroup( ) | Join an existing Registration Group. |
| RMLeaveGroup( ) | Leave a Registration Group |
| RMAddPreferences( ) | Add preference to a Registration Group |
| RMRemovePreferences( ) | Remove preference from a Registration Group |
| RMAddBlacklist( ) | Add an entry to a groups blacklist. |
| RMRemoveBlacklist( ) | Add an entry from a groups blacklist. |
| RMSubscribe( ) | Subscribe to a particular event that is related to a particular registration group. |
| RMUnSubscribe( ) | Unsubscribe from an event that was previously subscribed to. |
| RMConfigTrigger( ) | Configure the RM to automatically take some action when a particular event occurs. |
| RMRemoveTrigger( ) | Remove a previously configured response to a particular event. |
| API's Initiated by the RM | |
| RMRegisterCmd( ) | Command an Application or Service layer to register to a particular service layer. |
| RMDeRegisterCmd( ) | Command an Application or Service layer to deregister to a particular service layer. |
| RMMoveRegistrationCmd( ) | Inform an Application or Service layer that its registration will be moving to another service layer and that it should deregister from its current service layer. |
| RMPauseRegistrationCmd( ) | Inform an Application or Service layer that to pause its communication with the service layer(s) that it is currently connected to. |
| RMResumeRegistrationCmd( ) | Inform an Application or Service layer that it may resume its communication with the service layer(s) that it is currently connected to. |

Table 6 below is a list and descriptions of the common identifiers that are used in the Registration Manager's APIs.

TABLE 6

| Parameter | Description |
| --- | --- |
| RMMemberID | The Application or Service layer identifier of the entity that is calling the API. |
| RMGroupID | The name of a Registration Group |
| RMServiceLayerID | A service layer identifier. |
| RMCallbackFcn | A pointer to a callback function that should be called upon completion of the request. |
| RMRequestResult | A success or error indication. |
| RMGroupMembers | A list of RMMemberID's. |
| RMGroupRegPreferences | A list of Registration Group Preferences. |
| RMGroupAvailableList | A list of Service layers that meet the groups preferences and the details of each service layer. |
| RMGroupEventTriggers | The list of events that are automatically configured to occur for the group in response to some event. |
| RMGroupRegHistory | A list of service layers that the group is currently and has been registered with. |

TABLE 6-continued

| Parameter | Description |
|---|---|
| RMGroupBlacklist | A list of service layers that the group members have indicated they should not register with. |
| RMGroupSubscriptions | A list of events that should generate a notification to the subscribing service layer. |

Table 7 below is a list of fields in an API that is called by an application or a service to create a registration group. This is referred to as an RMCreateGroup( )

TABLE 7

| Parameter | I/O | Description |
|---|---|---|
| RMMemberID | I | The Application or Service layer identifier of the entity that is calling the API. |
| RMGroupID | I | The proposed group name. |
| RMCallbackFcn | I | N/A This API is blocking. |
| RMGroupID | O | The assigned group name. |
| RMRequestResult | O | A success or error indication. |

Table 8 below is a list of fields in an API that is called by an application or a service layer to get a list of groups that it may consider joining. This is referred to as an RMReadGroupList( ) API.

TABLE 8

| Parameter | I/O | Description |
|---|---|---|
| RMMemberID | I | The Application or Service layer identifier of the entity that is calling the API. |
| RMCallbackFcn | I | N/A This API is blocking. |
| RMGroupList | O | A list of group identifiers for the groups that are managed by the RM |
| RMRequestResult | O | A success or error indication. |

The fields of the RMReadGroupConfig( ) API are shown below in Table 9. This API is called by an application or a service layer to get the details of a particular group. An application or service layer may use this API call if it is considering joining the group or if it is already a member of the group and wants to review its configuration. In response to this API call, the RM will return the group's membership list, registration preferences, Available list, subscriptions, event triggers, registration history, and blacklist. The fields of the RMJoinGroup( ) API are provided in Table 10 below. The RMJoinGroup( ) API is called by an application or service layer to request to join a group.

TABLE 9

| Parameter | I/O | Description |
|---|---|---|
| RMMemberID | I | The Application or Service layer identifier of the entity that is calling the API. |
| RMGroupID | I | The group name. |
| RMGroupMembers | O | A list of RMMemberID's. |
| RMGroupRegPreferences | O | The aggregate registration preferences for the group. |
| RMGroupAvailableList | O | A list of Service layers that meet the group's preferences and the details of each service layer. |
| RMGroupEventTriggers | O | The complete list of triggers that have been configured for the group. |
| RMGroupRegHistory | O | A list of service layers that the group is currently and has been registered with. |

TABLE 9-continued

| Parameter | I/O | Description |
|---|---|---|
| RMGroupBlacklist | O | The complete list of service layers that have been blacklisted for the group. |
| RMCallbackFcn | O | N/A This API is blocking. |
| RMRequestResult | O | A success or error indication. |

TABLE 10

| Parameter | I/O | Description |
|---|---|---|
| RMMemberID | I | The Application or Service layer identifier of the entity that is calling the API. |
| RMGroupID | I | The group name. |
| RMGroupRegPreferences | I | New preferences for the group upon acceptance of this group membership request. |
| RMGroupSubscriptions | I | Subscriptions to be created for the new group member. |
| RMGroupEventTriggers | I | New event triggers for the group upon acceptance of this group membership request. |
| RMGroupBlacklist | I | New blacklist entries for the group upon acceptance of this group membership request. |
| RMCallbackFcn | I | N/A This API is blocking. |
| RMRequestResult | O | A success or error indication. |

The fields of the RMLeaveGroup( ) API are shown in Table 11. This API that is called by an application or service layer when it wants to leave a group. The RM will remove any of the group's preferences, subscriptions, event triggers, and blacklist entries that were created by the application or service layer.

TABLE 11

| Parameter | I/O | Description |
|---|---|---|
| RMMemberID | I | The Application or Service layer identifier of the entity that is calling the API. |
| RMGroupID | I | The group name. |
| RMCallbackFcn | I | N/A This API is blocking. |
| RMRequestResult | O | A success or error indication. |

The RMAddPreferences( ) API is shown below in Table 12 and is called by an application or service layer when it wants to add to a group's preferences.

TABLE 12

| Parameter | I/O | Description |
|---|---|---|
| RMMemberID | I | The Application or Service layer identifier of the entity that is calling the API. |
| RMGroupID | I | The group name. |
| RMGroupRegPreferences | I | New preferences for the group upon acceptance of this group membership request. |
| RMCallbackFcn | I | N/A This API is blocking. |
| RMRequestResult | O | A success or error indication. |

The fields of the RMRemovePreferences( ) API are shown in Table 13 below. This API is called by an application or service layer when it wants to remove some of the group's preferences. An application or service layer may only remove preferences that it created.

TABLE 13

| Parameter | I/O | Description |
|---|---|---|
| RMMemberID | I | The Application or Service layer identifier of the entity that is calling the API. |
| RMGroupID | I | The group name. |
| RMGroupRegPreferences | I | New preferences for the group upon acceptance of this group membership request. |
| RMCallbackFcn | I | N/A This API is blocking. |
| RMRequestResult | O | A success or error indication. |

The fields of the RMAddBlacklist( ) API are shown below in Table 14. This API is called by an application or service layer when it wants to add to the group's blacklist.

TABLE 14

| Parameter | I/O | Description |
|---|---|---|
| RMMemberID | I | The Application or Service layer identifier of the entity that is calling the API. |
| RMGroupID | I | The group name. |
| RMGroupBlacklist | I | The complete list of service layers that have been blacklisted for the group. |
| RMCallbackFcn | I | N/A This API is blocking. |
| RMRequestResult | O | A success or error indication. |

The fields of the RMRemoveBlacklist( ) API are shown below in Table 15. This API is called by an application or service layer when it wants to remove a service layer from the group's blacklist. An application or service layer may only remove blacklist entries that it created.

TABLE 15

| Parameter | I/O | Description |
|---|---|---|
| RMMemberID | I | The Application or Service layer identifier of the entity that is calling the API. |
| RMGroupID | I | The group name. |
| RMGroupBlacklist | I | New preferences for the group upon acceptance of this group membership request. |
| RMCallbackFcn | I | N/A This API is blocking. |
| RMRequestResult | O | A success or error indication. |

The fields of the RMSubscribe( )) API are shown below in Table 16. This API is called by an application or service layer when it wants to subscribe to an event.

TABLE 16

| Parameter | I/O | Description |
|---|---|---|
| RMMemberID | I | The Application or Service layer identifier of the entity that is calling the API. |
| RMGroupID | I | The group name. |
| RMGroupSubscriptions | I | A list of events that should cause a notification to be sent to the group member. |
| RMCallbackFcn | I | N/A This API is blocking. |
| RMRequestResult | O | A success or error indication. |

RMUnSubscribe( )

The fields of the RMUnSubscribe( )) API are shown below in Table 17. This API is called by an application or service layer when it wants to remove a subscription. An application or service layer may only remove a subscription that it created.

TABLE 17

| Parameter | I/O | Description |
|---|---|---|
| RMMemberID | I | The Application or Service layer identifier of the entity that is calling the API. |
| RMGroupID | I | The group name. |
| RMGroupSubscriptions | I | A list of events subscriptions that are associated with the requesting group member and that should be removed. |
| RMCallbackFcn | I | N/A This API is blocking. |
| RMRequestResult | O | A success or error indication. |

RMConfigTrigger( )

The fields of the RMConfigTrigger( )) API are shown below in Table 18. This API is called by an application or service layer when it wants to configure a trigger for the group. The configured trigger will be associated with the creating member and can only be deleted by the creating member.

TABLE 18

| Parameter | I/O | Description |
|---|---|---|
| RMMemberID | I | The Application or Service layer identifier of the entity that is calling the API. |
| RMGroupID | I | The group name. |
| RMGroupEventTriggers | I | The complete list of triggers that have been configured for the group. |
| RMCallbackFcn | I | N/A This API is blocking. |
| RMRequestResult | O | A success or error indication. |

The fields of the RMRemoveTrigger( ) API are shown below in Table 19. This API is called by an application or service layer when it wants to remove a trigger. An application or service layer may only remove a trigger that it created.

TABLE 19

| Parameter | I/O | Description |
|---|---|---|
| RMMemberID | I | The Application or Service layer identifier of the entity that is calling the API. |
| RMGroupID | I | The group name. |
| RMGroupEventTriggers | I | The complete list of triggers that have been configured for the group. |
| RMCallbackFcn | I | N/A This API is blocking. |
| RMRequestResult | O | A success or error indication. |

RMRegisterCmd( )

The fields of the RMRegisterCmd( ) API are shown below in Table 20. This API is called by the RM to command an application or service layer to register to a particular service layer.

TABLE 20

| Parameter | I/O | Description |
|---|---|---|
| RMMemberID | I | The Application or Service layer identifier of the entity that is calling the API. |
| RMGroupID | I | The proposed group name. |
| RMServiceLayerID | I | The identifier of the service layer to register to. |
| RMCallbackFcn | I | A callback function may be provided by the RM so that the recipient Application or Service layer may perform a callback when the registration is complete. |
| RMRequestResult | O | A success or error indication. |

The fields of the RMDeRegisterCmd( ) API are shown below in Table 21. This API is called by the RM to command an application or service layer to de-register to a particular service layer.

TABLE 21

| Parameter | I/O | Description |
| --- | --- | --- |
| RMMemberID | I | The Application or Service layer identifier of the entity that is calling the API. |
| RMGroupID | I | The group name. |
| RMServiceLayerID | I | The identifier of the service layer to deregister with. |
| RMCallbackFcn | I | A callback function may be provided by the RM so that the recipient Application or Service layer may perform a callback when the de-registration is complete. |
| RMRequestResult | O | A success or error indication. |

The fields of the RMMoveRegistrationCmd( )) API are shown below in Table 22. This API is called by the RM to command an application or service layer to move its registration from one service layer to another.

TABLE 22

| Parameter | I/O | Description |
| --- | --- | --- |
| RMMemberID | I | The Application or Service layer identifier of the entity that is calling the API. |
| RMGroupID | I | The group name. |
| RMServiceLayerID | I | The identifier of the current service layer. |
| RMServiceLayerID | I | The identifier of the new service layer. |
| RMCallbackFcn | I | A callback function may be provided by the RM so that the recipient Application or Service layer may perform a callback when it is ready to switch to a new network and initiate contact with the new service layer. |
| RMRequestResult | O | A success or error indication. |

The fields of the RMPauseRegistrationCmd( )) API are shown below in Table 23. This API is called by the RM to command an application or service layer to pause its interaction with a particular service layer. This command may be used by the RM when the RM is going to request that the device switch to other networks to perform service discovery. This API provides a way for the RM to warn Application and Service layers that the network connection to their service layer will be temporarily disabled.

TABLE 23

| Parameter | I/O | Description |
| --- | --- | --- |
| RMMemberID | I | The Application or Service layer identifier of the entity that is calling the API. |
| RMGroupID | I | The group name. |
| RMServiceLayerID | I | The identifier of the current service layer. |
| RMCallbackFcn | I | A callback function may be provided by the RM so that the recipient Application or Service layer may perform a callback when its service layer session has been paused and it is ready to temporarily lose the ability to contact its service layer. |
| RMRequestResult | O | A success or error indication. |

The fields of the RMResumeRegistrationCmd( ) API are shown below in Table 24. This API is called by the RM to command an application or service layer so that its interaction with a particular service layer may resume. This command may be used by the RM to inform the Application or Service layer that its network connection with its Service layer has been restored.

Upon receiving this message, the Service layer or Application may wish to refresh its registration with the service layer (if period registration refreshes are required).

TABLE 24

| Parameter | I/O | Description |
| --- | --- | --- |
| RMMemberID | I | The Application or Service layer identifier of the entity that is calling the API. |
| RMGroupID | I | The group name. |
| RMServiceLayerID | I | The identifier of the current service layer. |
| RMCallbackFcn | I | A callback function may be provided by the RM so that the recipient Application or Service layer may perform a callback when service layer session has been refreshed. |
| RMRequestResult | O | A success or error indication. |

Service Discovery API

The RM will use the Service Discovery API shown below in Table 25 that is used to initiate discovery procedures and obtain a list of what services are available. The API is exposed to the RM by a service discovery service.

TABLE 25

| Function | Description |
| --- | --- |
| ServiceDiscoveryReq( ) | A command to initiate a service discovery procedure. |

The fields of the ServiceDiscoveryReq( )) API are shown in Table 26 below. This API is called by the RM to initiate a service layer discovery procedure. The input to the discovery request will be a list of required and/or desired services. The output of the request will be a list of services that support the required/desired list(s).

Note that the Service Discovery procedure may support more input parameters to further refine the discovery results, such as the parameters that are specified in the registration preferences and listed in Table 1. If the service discovery procedure does not support parameters such as those listed in Table 1, then it is the responsibility of the RM to discard discovered service layers that do not meet the aggregate preferences of the group.

TABLE 26

| Parameter | I/O | Description |
| --- | --- | --- |
| Required ServicesList | I | A list of required services |
| Desired ServicesList | I | A list of desired services |
| Discovered ServicesList | O | A list of discovered services |

Platform Interfaces

The physical platform that hosts the RM may support platform-specific interfaces. These interfaces are generally provided by the platform OS. Examples include:

Wi-Fi Modem;

Cellular Modem and SIM card;

An interface to the GPS chipset;

An interface to on-board sensors such as temperature, light, and motion sensors.

In the following sub-section, we describe how the platform interfaces will be used. We do not define a complete API for each interface since these interfaces will be provided by the platform. In some cases, we indicate API's names that are provided by existing Operating Systems.

Wi-Fi Modem Interface

The RM will use its Wi-Fi Modem Interface to find networks that may be used to reach Service layers. While in the "De-Registered Searching" or "Registered—Session Paused" states the RM may also use this interface to get the platform to connect to different networks so that service discovery can be performed on multiple networks.

The RM will interface to the platform's Wi-Fi modem to perform the actions that are enumerated in the bullet list below. The RM can access the Wi-Fi modem by directly using API's that are provided by the platform's OS or by interfacing the platform's Wi-Fi connection manager. The Wi-Fi connection manager is an application that interfaces to the OS on behalf of other applications and/or a GUI.

On a Platform that runs the Android OS, the RM may use the android.net API to initiate the scan. For example the getNetworkInfo(Wi-Fi) method of the ConnectivityManager class may be used to get the status of the current Wi-Fi connection. On a Platform that runs the Android OS, the RM may use the android.net.wifi API to initiate the scan. For example the startScan( )) method of the WiFiManager class may be used to initiate the scan and the getScanResults( )) method of the WiFiManager class may be used to get the scan results.

On a Platform that runs the Android OS, the RM may use the android.net.wifi API to connect to the Wi-Fi network. For example the enableNetwork( )) method of the WiFi-Manager class may be used to connect to the network. On a Platform that runs the Android OS, the RM may use the android.net.wifi API to disconnect from the Wi-Fi network. For example the disableNetwork( )) method of the WiFi-Manager class may be used to disconnect from the network.

On a Platform that runs the Android OS, the RM may use the android.net.wifi API to get information such as the current link speed and signal level. For example the get-ConnectionInfo( ) method of the WiFiManager class may be used to get the current link speed and the calcualteSignal-Level( )method of the WiFiManager class may be used to get the signal level.

Cellular Modem Interface

The RM will use its Cellular Modem Interface to find networks than may be used to reach Service layers. While in the "De-Registered Searching" or "Registered—Session Paused" states the RM may also use this interface to get the platform to connect to different networks so that service discovery can be performed on multiple networks.

The RM will interface to the platform's Cellular modem to perform the actions that are enumerated in the bullet list below. The RM can access the Cellular modem by directly using API's that are provided by the platform's OS. On a Platform that runs the Android OS, the RM may use the android.net API to check if the model is connected to a packet data network. For example the getNetworkInfo (UMTS, GSM, or LTE) method of the ConnectivityManager class may be used to get the status of the current cellular connection.

Check the state of the SIM card. If it is determined that the SIM card has been removed, then the RM may decide to command all group members to deregister from their service layer(s) in case the device has been tampered with.

On a Platform that runs the Android OS, the RM may use the android.telephony API to check the SIM card's state. For example the getSimState( )) method of the TelephonyManager class may be used to get the status of the SIM card. If it is determined that the RM is now connected to a different cellular modem or associated with a different SIM card, then the RM may decide to command all group members to deregister from their service layer(s) in case the device has been tampered with.

On a Platform that runs the Android OS, the RM may use the android.telephony API to check the modem ID. For example the getDeviceID( )method of the TelephonyManager class may be used to get the IMEI of the cellular modem. If it is determined that the RM is now connected to a different SIM or modem, then the RM may decide to command all group members to deregister from their service layer(s) in case the device has been tampered with.

On a Platform that runs the Android OS, the RM may use the android.telephony API to check the modem ID. For example the getSubscriberID( )method of the TelephonyManager class may be used to get the IMSI of the SIM card.

Some applications or service layers may wish to only register via cellular networks that belong to particular operators or have relations ships with certain Service Providers. On a Platform that runs the Android OS, the RM may use the android.telephony API to check the SIM card's state. For example the getSimOperatorName( )) method of the TelephonyManager class may be used to get the operator's name.

If the device is roaming, then then RM may decide to steer service layer registrations towards a cheaper network connection (i.e. Wi-Fi). On a Platform that runs the Android OS, the RM may use the android.telephony API to check the SIM card's state. For example the isNetworkRoaming( )) method of the TelephonyManager class may be used to check if the modem is roaming.

GPS Interface

The RM will use its GPS Interface to detect its location or changes of location. A change in location may cause the RM to take some action such as searching for new networks and/or initiating new service discovery procedure(s) to see if service layers should be added or removed from the Available Lists. A change in location may also cause the RM to command certain groups to deregister from their service layer. A deregistration may be desirable because certain service layer may only be useful in a certain area or movement out of or into a particular area may indicate that the device has been tampered with.

The RM will interface to the platform's GPS chipset to perform the actions that are enumerated in the list below. The RM may access the GPS chipset by directly using API's that are provided by the platform's OS. The RM may check the current location. On a Platform that runs the Android OS, the RM may use the android.location API to check the current location. For example the getLastKnownLocation( )) method of the LocationManager class may be used to check if the modem is roaming.

The RM may also request and receive notifications when the location changes. On a Platform that runs the Android OS, the RM may use the android.location API to request location updates. For example the requestLocationUpdates ( )) method of the LocationManager class may be used to request location updates. The method provides the caller with a means for indicating what action should be taken when the notification is required. The call specifies the action by providing the OS with a pointer to the code that should be executed when the notification is required. For example, the RM can point the OS to piece of code that will cause the RM to command a registration group to de-register when the device's location changes.

The RM may request and receive notifications when entering a certain area. On a Platform that runs the Android OS, the RM may use the android.location API to request notifications when the device enters a particular area. For example the addProximityAlert( ) method of the Location-Manager class may be used to request notifications when the device enters a particular area. The method provides the caller with a means for indicating what action should be taken when the notification is required. The call specifies the action by providing the OS with a pointer to the code that should be executed when the notification is required. For example, the RM can point the OS to piece of code that will cause the RM to command a registration group to de-register when the device enters or leaves a particular area.

Sensor Interface

The device platform may be used to interface to sensors such as temperature sensors, light sensors, motion sensors, health monitoring sensors, etc. Information from these sensors may be used to trigger certain RM actions, such as the actions that are described in Table 3. For example, information from motion sensors and the GPS chip set may be combined to detect that the user is running on a tread mill. This may be an indication that the RM should search for a Service layer that is associated with gym technology.

The RM may interface directly to the sensors using API's that are provided by the OS. For example, the Android OS provides API's for interfacing to the device's USB and Bluetooth interfaces via the android.hardware.usb and android.bluetooth API's respectively.

Alternatively, the RM may interface to another application rather than directly to the sensors. For example, it may interface to an application that collects motion data from a motion sensor and location data from the GPS chip set and makes decisions about the devices context (i.e. it may decide that the user is jogging in place). This context information may be passed from the application to the RM. The application that passes this information to the RM may be considered a standalone service.

Registration Manager GUI

Figure 8:
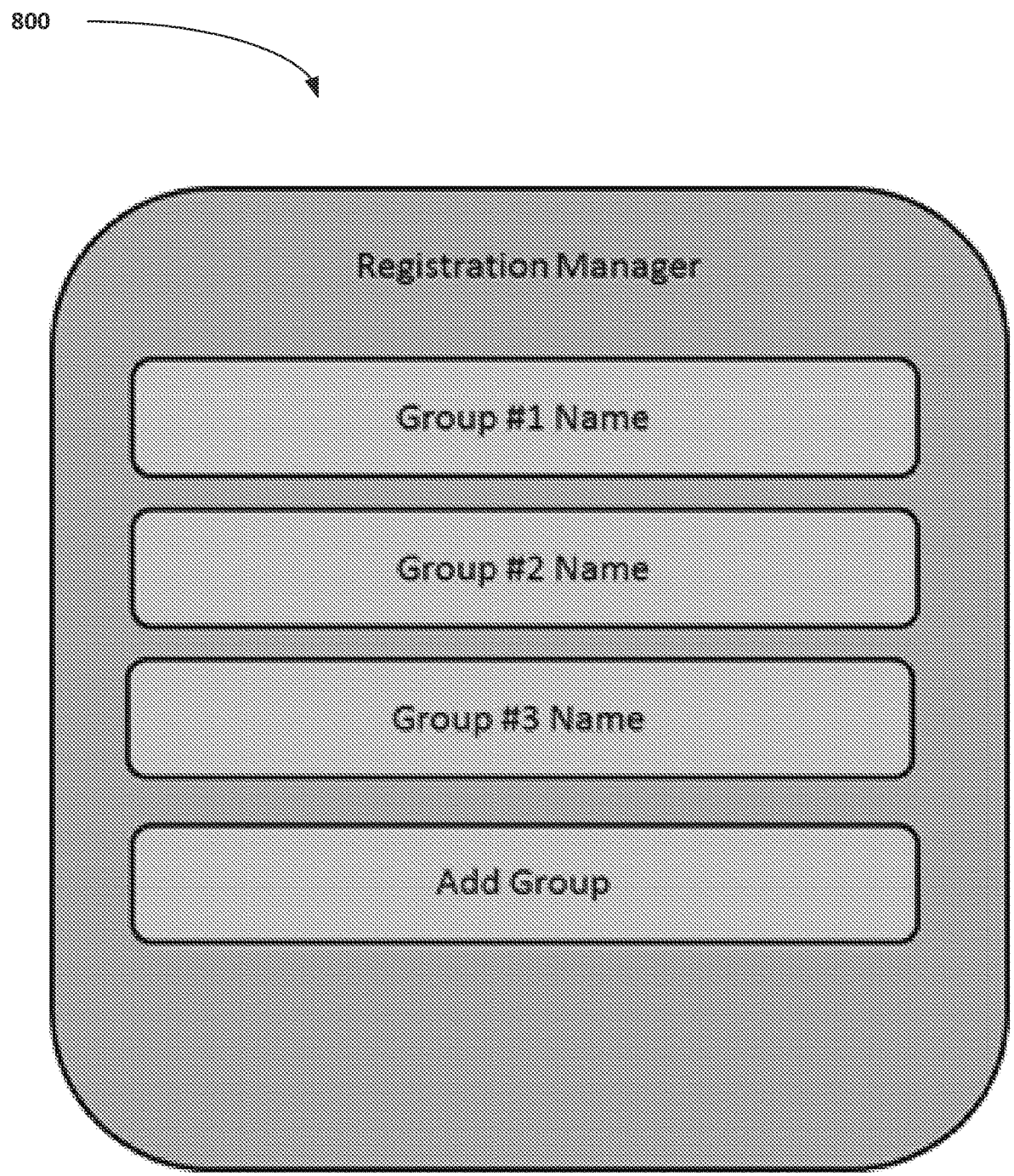
FIG. 8 illustrates a graphical user interface of a registration management according to an embodiment of the application.

According to a further embodiment, the RM may display a GUI that can be used to observe the RM's state, initiate new discovery procedures, modify registration preferences, etc. An example of the main GUI display 800 is shown in FIG. 8. The main page may display a button for each of the existing group names. As illustrated, there are three buttons 810, 820 and 830. In addition, there may also be a button 840 to start a procedure for adding a new group. The GUI display 800 can be shown on a display as described above and illustrated in FIGS. 1C and 1D.

Figure 9:
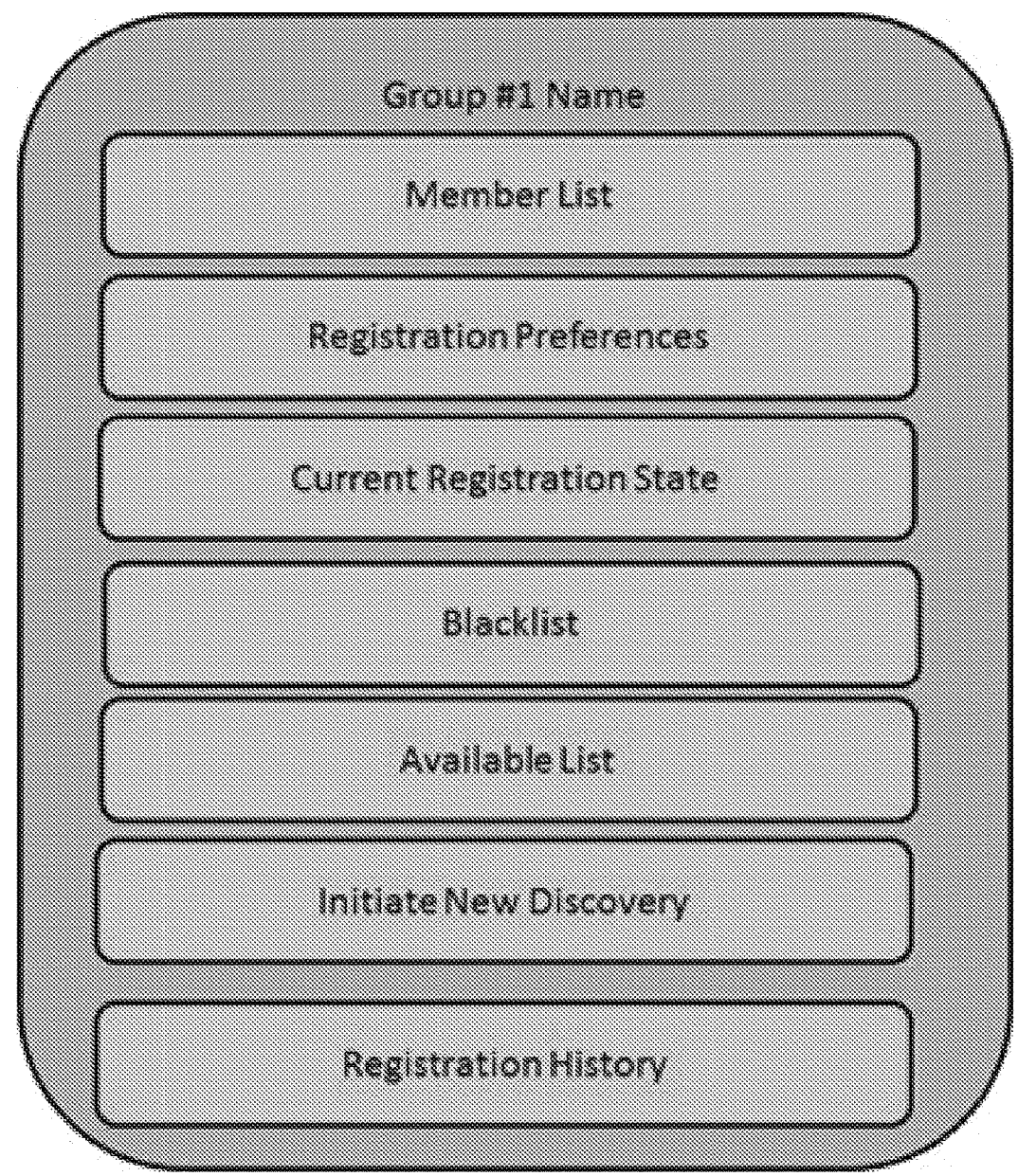
FIG. 9 illustrates an embodiment of a graphical user interface of a registration management according to an embodiment of the application.

In a further embodiment, by pressing or clicking on one of the existing group names, such as, for example, Group #1 Name 810, a display 900 as illustrated in FIG. 9 will appear. FIG. 9 shows how the group details might be displayed. The group members may be listed under the "member list" button 910. The GUI display in FIG. 9 can be shown on a display as described above and illustrated in FIGS. 1C and 1D.

A "registration preferences" button 920 may be provided. Pressing or clicking on "registration preferences" button 920 may display the group's registration preferences and allow the user to type in preferences. The current registration state 930 may be displayed, including the name of the service layer that the group is currently registered to. The GUI may display a "blacklist" button 940 and allow the user to type in new service layers to add to the blacklist. The GUI may display a list of what service layers meet the group's registration preferences and are available for registration per the "available list" button 950. The GUI may provide a button that the user can press or click on to initiate a new discovery procedure via the "initiate new discover" button 960. The GUI may also include a place for the user to enter network name(s) that service discovery should be performed on. The GUI may also provide a button "registration history" 970 that the user can press, or click, in order to view the group's registration history.

The GUI may also have an interface to the RM so that it can display information to the user, allow the user to modify group settings, and allow the user to initiate procedures such as discovery. The RM may make an API as discussed above in the application available to the RM.

Figure 10:
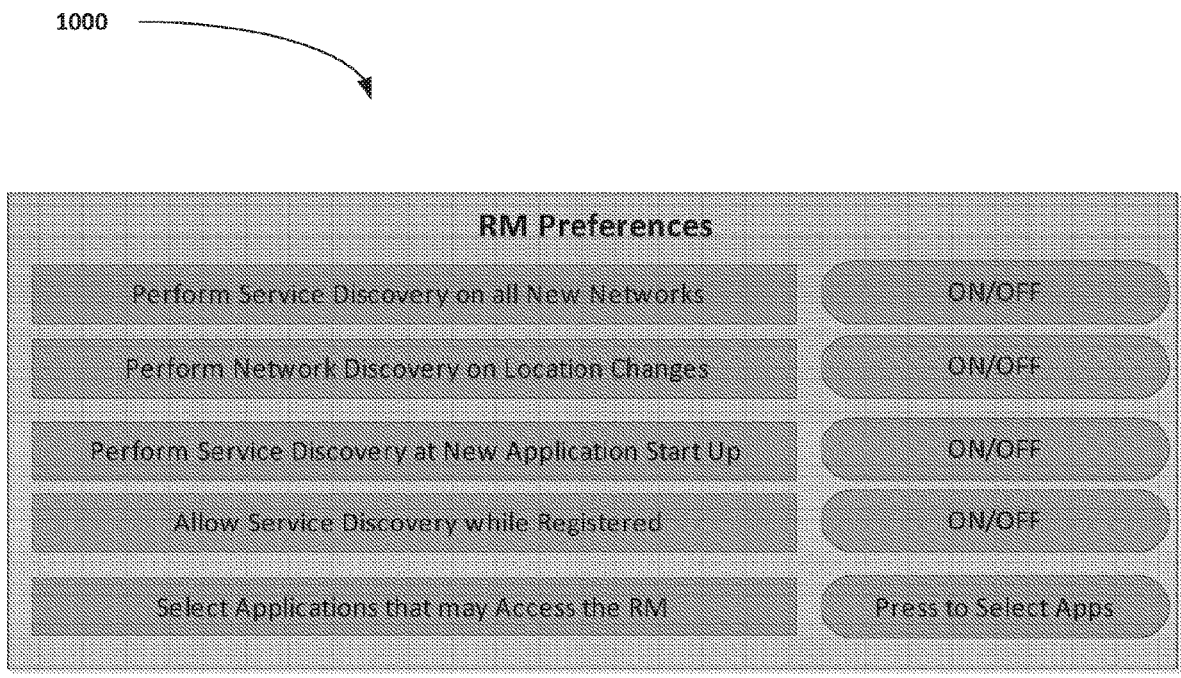
FIG. 10 illustrates an embodiment of Registration Management preference according to an embodiment of the application.

The RM may have other GUI's available such as the GUI 1000 for "RM Preferences" shown in FIG. 10. This GUI allows the user to do one or more of the actions.

For example option 1010 allows selection whether service discovery should be performed on all networks. Alternatively, the GUI could provide a setting that allows the user to select how often the device should search for new service providers. Option 1020 also select whether network discovery should be performed at all location changes. Alternatively, the GUI could provide a setting that allows the user to select how often the device should search for networks.

In addition, option 1030 allows selection whether service discovery should be performed whenever a new application is started. This might be required if applications alter the requirements of what service layer features are needed. Option 1040 allows selection whether the RM should perform service discovery when the device is already registered to a service layer. Further, option 1050 allows selection of which applications are allowed to use the RM service. Alternatively, the GUI could also allow the user to select some applications that are allowed to use the RM, but not alter the RM's search preferences.

Group Creation through Initial Registration

Figure 11:
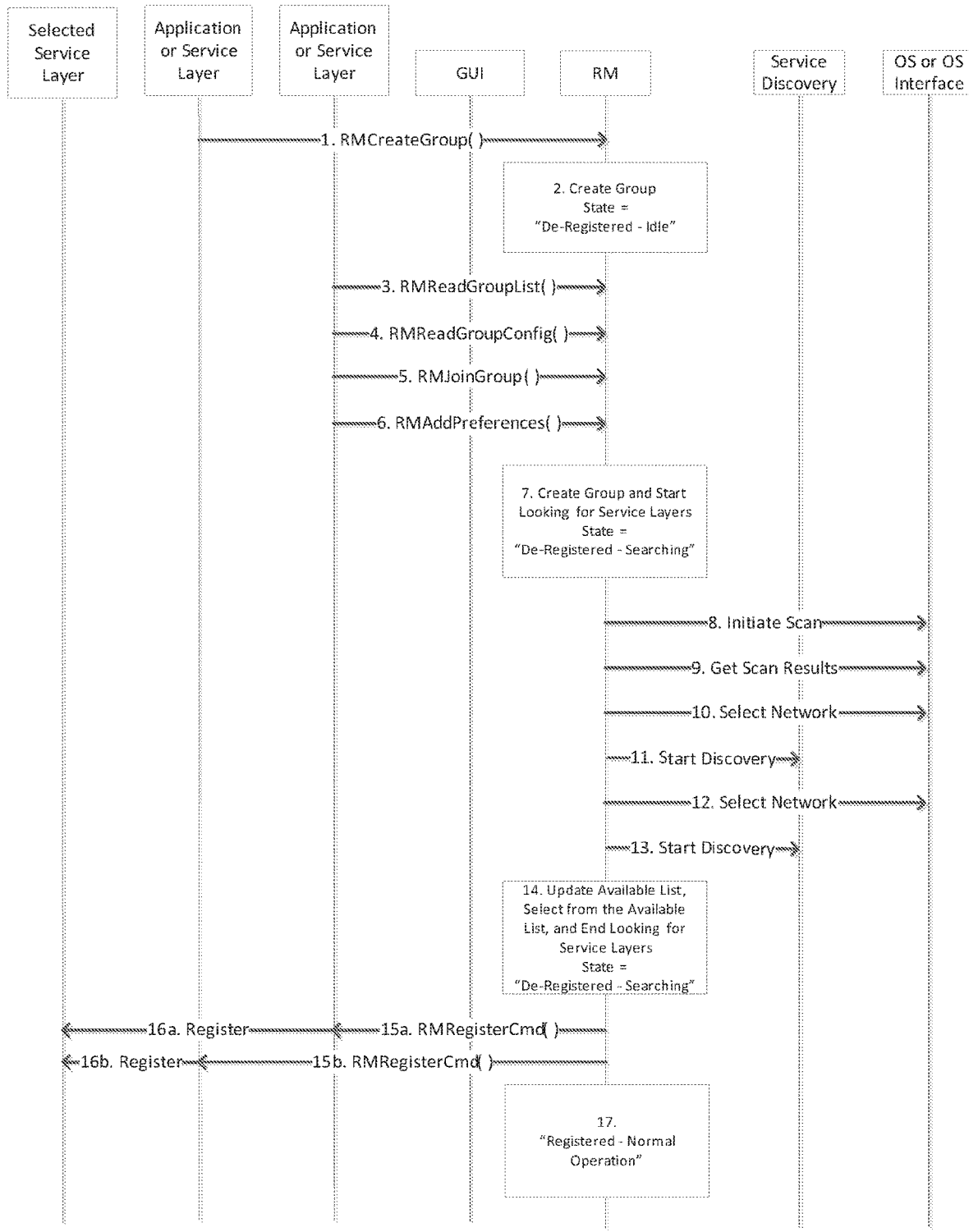
FIG. 11 illustrates a process for creating and updating a registration management group according to the application.

According to another aspect of the application, a method for group creation through initial registration is shown in FIG. 11. Each of the steps is denoted by a numeral, e.g., 1., 2., etc. Here, the application or service layer may use the RMCreateGroup( ) API described earlier in this application to request creation of a group in Step 1. As described above, the create group request will propose a name for the group and the RM will respond with a group name in Step 2. The RM may assign a name other than the proposed name. That is, if the proposed name is already taken or not properly formatted. The RM may be implemented such that the reception of a create group command will cause a new execution thread to be initiated. The new thread will manage the newly created group. The RM will put the newly created group in the "De-Registered Idle" state. If a new thread is created to manage the group, then the new thread will be initialized to the "De-Registered Idle" state.

An application or service layer may use the RMReadGroupList( ) API to read the list of groups that are managed by the RM in Step 3. An application or service layer may do this at startup before registering to any Service layer. The application or service layer will use the RM to find a service layer to register to. The application or service layer may simply use the set of API's to access the RM and it may be provisioned with a location that can be used to reach the RM or the address of the RM may be obtained by reading a well-known address. The applications and service layers that use the RM will often be hosted on the same platform as the RM.

After getting the group list, the application or service layer may use the RMReadGroupConfig( ) API to read the details of an existing group in Step 4. The application or service layer will consider what other applications and services are part of the group, consider the group preferences, and consider the group triggers and make a decision about joining the group. This step may be executed multiple times for each group that the application or service layer would like to consider joining. Alternatively, the RMReadGroupConfig( )) API may be modified to support the possibility of providing the application or service layer with the configuration details of multiple groups.

The one or more applications or service layers may use the RMJoinGroup( ) API described above to join the group in Step 5 that was selected in the previous step.

The application or service layer will use the RMAddPreferences( )) API described earlier in this application to indicate its preferences for the type of service layer that it would like to register with in Step 6. For example, the preferences may indicate that the application or service layer requires services such as data storage, semantics, data aggregation, etc. The preference may also indicate the link speed that is required for the service layer connection, the desired service layer owner (Service Provider), and the desired network owner. More examples of preferences are shown in Table 1 above.

The update to the group's preferences will cause the RM to transition the group from the "De-registered—Idle" state to the "De-Registered—Searching" state in Step 7. The RM will now begin searching for Service layers that will be suitable to the group. In step 8, the RM may request that a Wi-Fi or cellular scan be initiated so that it can obtain an updated list of the Wi-Fi or cellular networks that are available.

In step 9, the RM will parse the list of available Wi-Fi networks and decide which networks it would like to perform service discovery in. In Step 10, The RM will request that the Wi-Fi modem connect to a specific Wi-Fi network. In Step 11, the RM will send a request to the service discovery service requesting that service discovery be performed in the current network. The service discovery request may contain the group's registration preferences or a subset of the group's registration preferences. Any discovered service layers that meet the group's registration preferences will be added to the group's available list.

Steps 10 and 11 will be repeated for a different network name as indicated by Steps 12 and 13. In Step 14, the group's available list is now complete and the RM will select a service layer from the Available List. The RM will stop looking for service layers.

In steps 15a/b, the RM will use the RMRegisterCmd( ) API as described above to command the applications and service layers that belong to the group to register with the selected Service layer. This step will occur one time for each Application and Service layer that is part of the group. Thereafter, the applications and service layers will register with the selected service layer as shown in Steps 16a/b. Once all group members have registered, the RM will transition the group to the "Registered—Normal Operation" state as shown in Step 17.

Registration Related Event and a Registration Move

Figure 12:
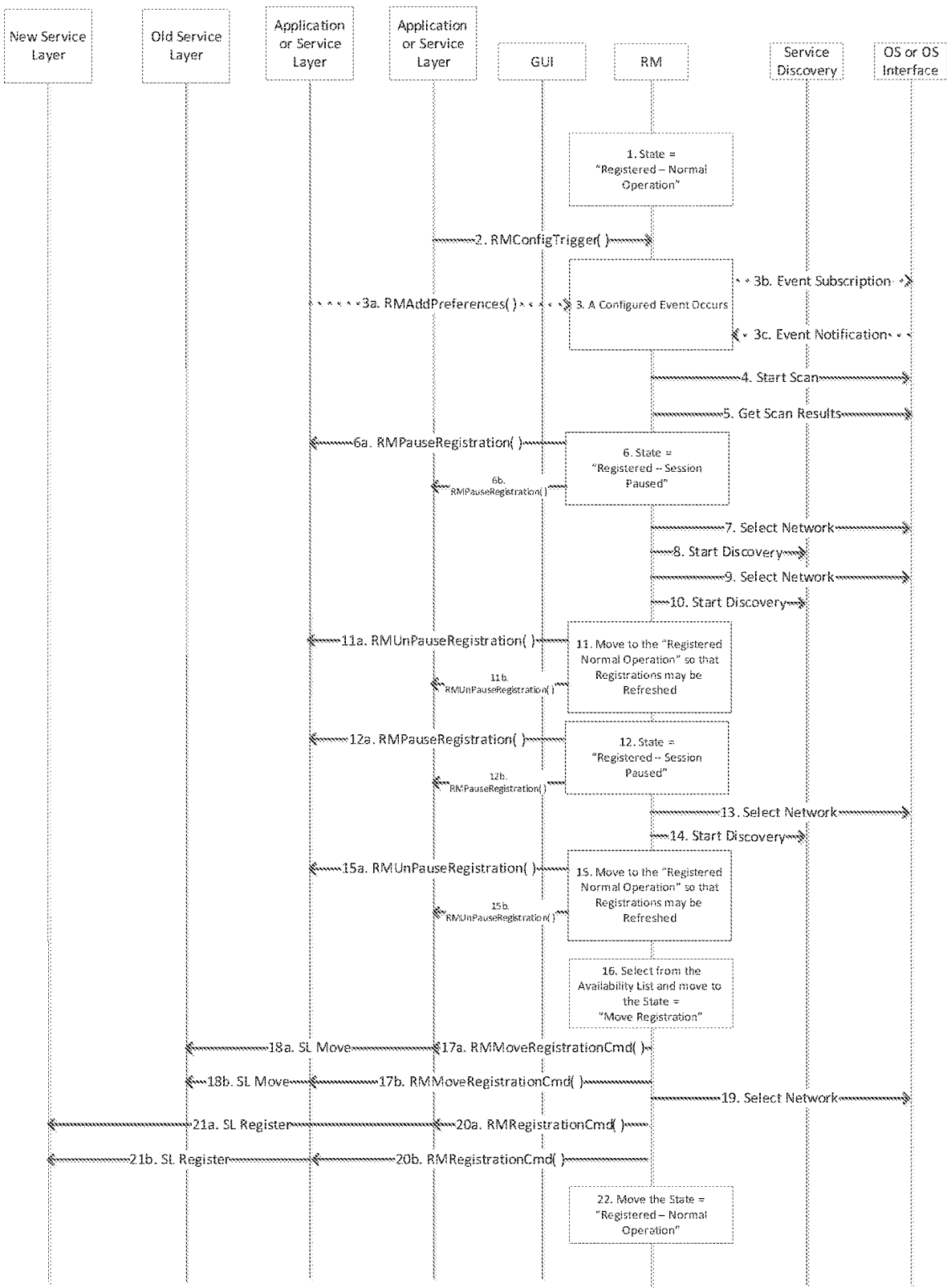
FIG. 12 illustrates a process for changing a service layer according to an embodiment of the application.

According to another aspect of the application, as illustrated in FIG. 12, there is disclosed a method for the RM to perform discovery. In particular, this method allows the RM to check if a more suitable service layer is available for the group. In an embodiment, the check may occur upon a condition precedent, e.g., event. Each of the steps in FIG. 12 is denoted by a numeral, e.g., 1, 2, etc.

The registration group is in the "Registered—Normal Operation" State as shown in Step 1. According to step 2, the RM will use the RMConfigTrigger( ) API as described earlier in this application as a trigger for the group. A trigger or condition precedent is a command that some action should take place if some event occurs first. For example, the RMConfigTrigger( )) API may be used to configure the RM to start a new service discovery procedure if a registration group member modifies the group's registration preferences. In another example, the RMConfigTrigger( )) API may be used to configure the RM to start a new service discovery procedure if the device enters a particular geographical area. In yet another example, the RMConfigTrigger( )) API may be used to configure the RM to select a new service layer from the Available list if the Available list is updated and there is a more suitable service layer in the list.

In Step 3, an event occurs. As discussed above, the event may relate to a trigger that has been configured for the group. Three possible events are discussed here. In Step 3A, the exemplary event is that an application or service layer that is a member of the group updates the group's registration preferences. In Step 3B, the RM informs the OS that it would like to subscribe to some event. For example, the RM may inform the OS that it would like to be informed if the device enters or leaves a particular geographical area. In Step 3C, the RM receives a notification from the OS that the event that was subscribed to in Step 3B has occurred. For example, this may be a notification that the device has entered or left a particular geographical area.

In Step 4, the RM will make a request to OS to scan for available networks. For example, this may be a request to scan for available Wi-Fi networks or cellular networks.

In Step 5, the RM will obtain the scan results which will be a list of the available Wi-Fi networks that were discovered in the scan. In one example, three networks will be discovered.

In Step 6, the RM will decide that it should move to one or more of the discovered Wi-Fi networks and perform service discovery to see if there are any service layers available. According to an embodiment, as the RM does not yet know if there are more suitable service layers for the group, it will ask the registration group members to pause their current service layer registration while the device moves to another Wi-Fi network to perform service discovery. As envisaged by this application, pausing the current service layer registration is necessary when the RM and discovery service are hosted on the same device as the registration group.

According to Steps 6A and 6B, the RM will use the RMPauseRegistration( ) API described above to inform the applications and service layers that belong to the group that they should pause their communication with the service layer that they are currently registered to. Once the service layers and applications indicate that their sessions have been paused, the RM will move to the "Registered—Session Paused" state.

In Step 7, the RM will request that the Wi-Fi modem connect to one of the Wi-Fi network names provided during the scan result of Step 5. In Step 8, the RM will send a request to the service discovery service requesting that service discovery be performed in the current network. The service discovery request may contain the group's registration preferences or a subset of the group's registration preferences. Any discovered service layers that meet the group's registration preferences will be added to the group's available list. Each of Steps 7 and 8 will be repeated one or more times, as provided by Steps 9 and 10, for each of the different networks located in the scan result of Step 5.

According to a further embodiment, and based on a timer, the RM will move back to the "Registered—Normal Operation" state so that the application and service layers can refresh their registrations with the current service layer(s) as illustrated by Step 10. In Steps 11A and 11B, the RM will use the RMResumeRegistration( ) API described above in the application to inform the applications and service layers that belong to the group that they may resume communication with the service layer that they are currently registered to and refresh their registrations.

In Step 12 based on a timer or indications that all service layer registrations have been refreshed, the RM will again ask the applications and service layers to pause their service layer sessions so that discovery may be performed on the third Wi-Fi network. Since the RM does not yet know if there are more suitable service layers for the group, it will ask the registration group members to pause their current service layer registration while the device moves to the other Wi-Fi network to perform service discovery.

In steps 12A and 12B, the RM will use the RMPauseRegistration( ) API described above in the application to inform the applications and service layers that belong to the group that they should pause their communication with the service layer that they are currently registered to. Once the service layers and applications indicate that their sessions have been paused, the RM will move to the "Registered—Session Paused" state. Step 7 directed to selecting a network, and Step 8 directed to starting discovery, may be repeated again after Step 12 as described in in Steps 13 and 14, respectively.

According to Step 15, once discovery has been completed, the RM will move back to the "Registered—Normal Operation" state so that the application and service layers can refresh their registrations with the current service layer(s). The current service layer(s) may include new service layer(s) located on the searched networks.

In Steps 15A and 15B, the RM will use the RMResumeRegistration( )) API described above in this application to inform the applications and service layers that belong to the group that they may resume communication with the service layer that they are currently registered to and refresh their registrations.

In yet another embodiment, according to Step 16, since the available list has been updated, this will cause the RM to check if a more suitable Service layer is available for the group. Assuming that there is a more suitable service layer available, the RM will begin moving the registration to the new service layer. Otherwise, the registration will be maintained with the existing service layer. The RM will move to the "Move Registration" state based on a timer or indications that all current service layer registrations have been refreshed.

Assuming a more suitable service layer is determined in Step 16, the RM will inform all Applications and Service layers in the group that they should move their service layer registration(s) to the new service layer. This may cause the group members to deregister from their current service layer(s) and/or provide their current service layer(s) with the name(s) of their new service layer(s) so that their registration and state information can be moved.

In Steps 17A and 17B, the RM will use the RMMoveRegistration( )) API described in the application to inform the applications and service layers that belong to the group that they will be moving to a new service layer. The RM will proceed based upon a timer or indications that all current service layer registrations have been refreshed. In Step 18, the applications and service layers will inform the service layer that they are currently registered to that they will be moving their registration. This operation may be a de-registration or a delayed deregistration.

In Step 19, the RM will issue a request to the OS that the device moves to the network hosting the selected, new service layer. According to Steps 20a/b, the RM will use the RMRegisterCmd( ) API to command the applications and service layers that belong to the group to register with the selected service layer. In Steps 21a/b, the applications or service layers will register with the new service layer. Based on a timer or an indication that all registrations have been completed, the registration group is in the "Registered—Normal Operation" State (Step 22).

Note that this example shows the case where deregistration from the old service layer occurs before registration with the new service layer and the case where the old service layer is told to delay registration until a timer expires. Alternatively, registration with the new service layer could occur first. Once registration with the new service layer is successful, the RM could move the device back to the old service layer's network and command the group members to deregister.

Embodiments

In various embodiments, The RM service may be integrated with the device OS. The API's that are described in the present application could be exposed by the API. In an embodiment, the RM may be part of the OS or interface to the OS. For example, an AllJoyn embodiment of the RM may be employed. Here, the RM may be part of the OS or interface to the OS.

Figure 13:
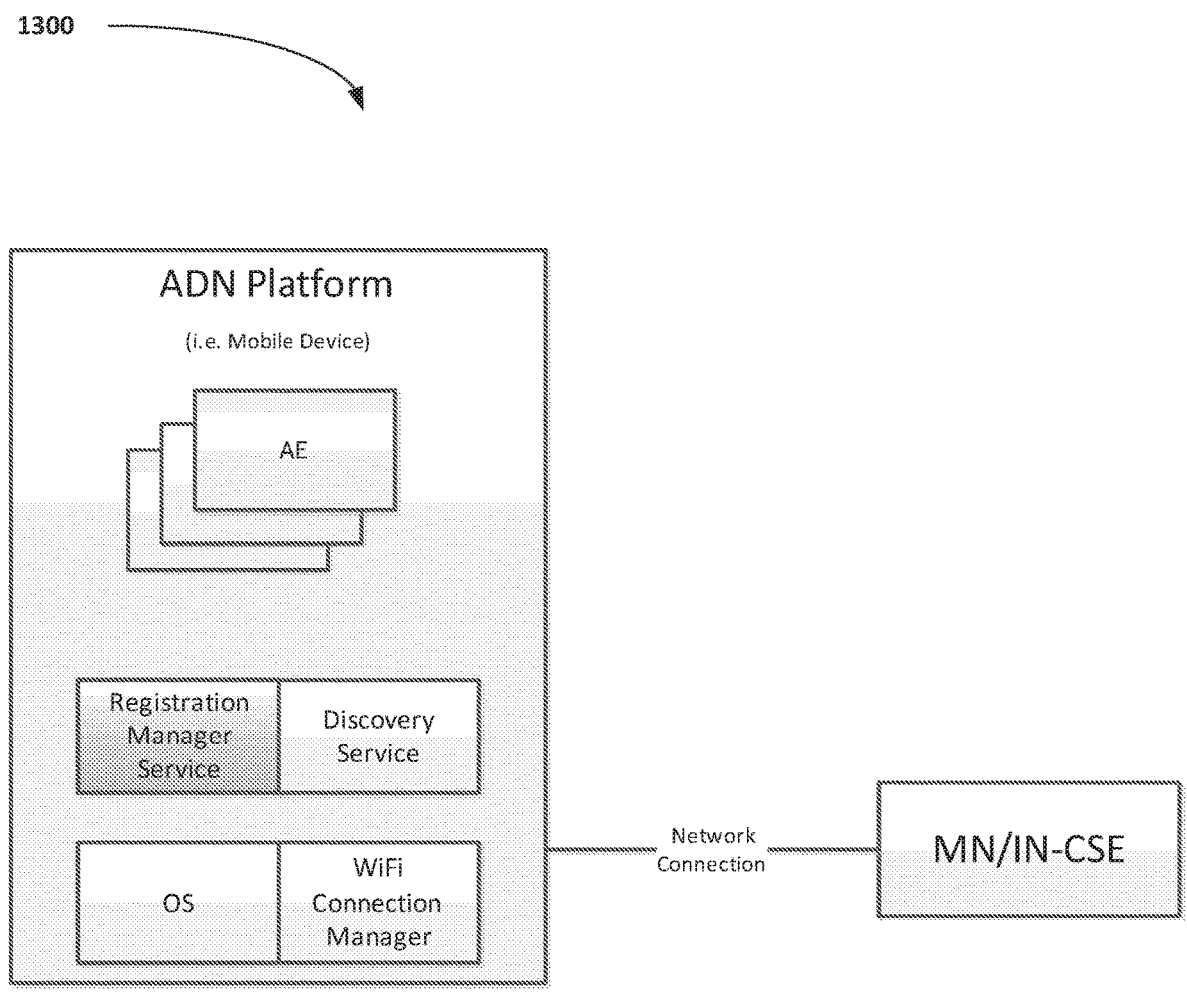
FIG. 13 illustrates an ADN platform according to an embodiment of the application.

In an exemplary oneM2M embodiment 1300 as shown in FIG. 13, an ADN 1310 has several AE's 1320 running on it. The ADN's only network interface is a Wi-Fi interface. Thus, the ADN is only capable of connecting to one network at a time. The AE's that run on the ADN were made by different companies and they do not communicate; they run independent of each other. The AE's all require some specific services from whatever IN/MN-CSE 1330 they register with.

The ADN platform has a built-in RM Service. The RM Service may be a standalone service or part of the ADN's OS. A set of API's have been exposed to the applications (AE's) so that the AE's can each use the RM to discover suitable service layer(s) and the AE's can coordinate their service layer registers with each other without directly communicating.

Figure 14:
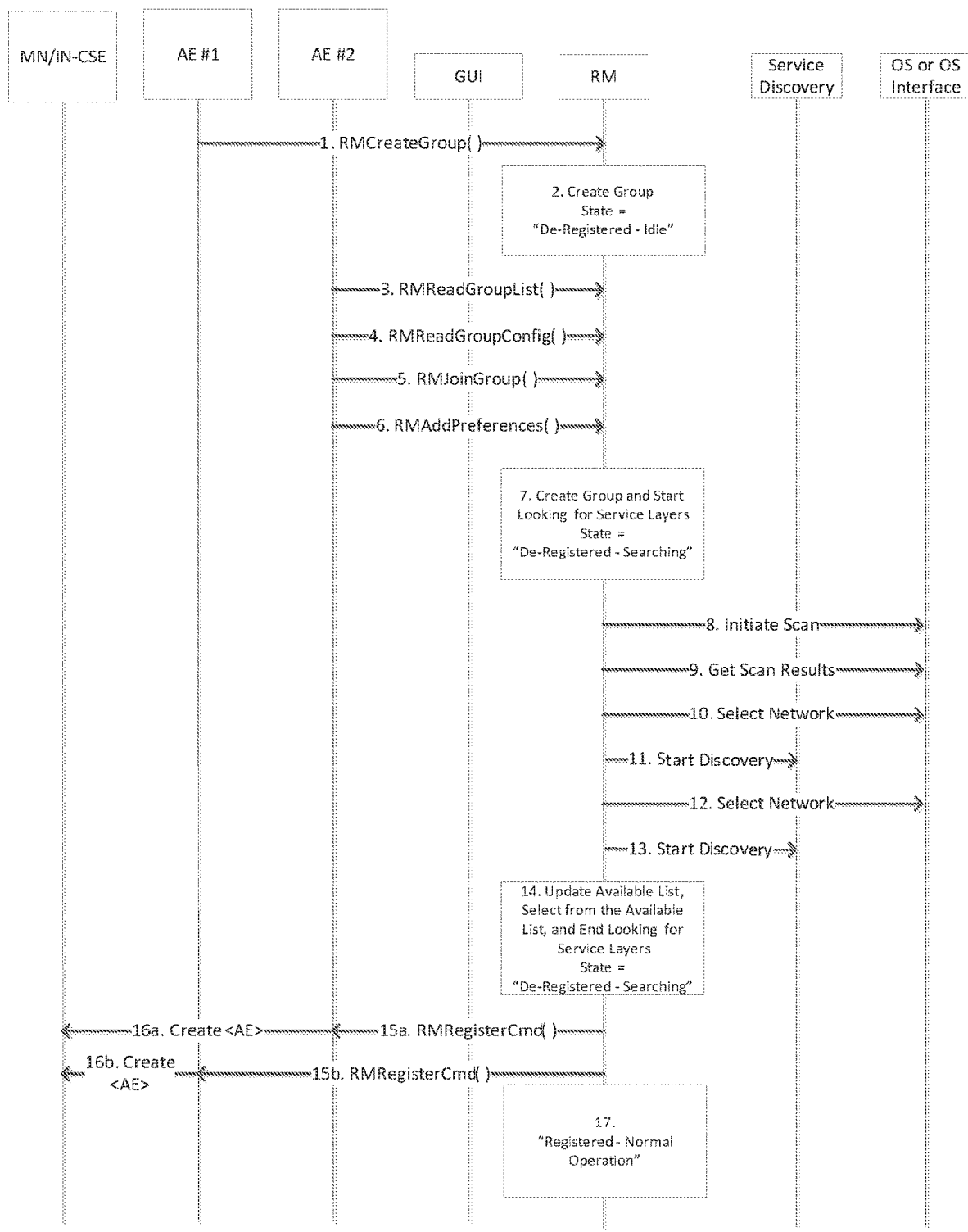
FIG. 14 illustrates a process for an application entity to join a group according to an embodiment of the application.

FIG. 14 is an updated version of FIG. 11. The steps of FIG. 14 are denoted by numerals, e.g., 1, 2, etc. A first oneM2M ADN-AE uses the RMCreateGroup( ) API according to the application to create a group according to Step 1. The create group request will propose a name for the group and the RM will respond with a group name. The RM may assign a name other than the proposed name, i.e., if the proposed name is already taken. The RM may be implemented such that the reception of a create group command will cause a new execution thread to be initiated. The new thread will manage the newly created group.

The RM may be implemented such that the reception of a create group command will cause a new execution thread to be initiated. The new thread will manage the newly created group. The RM will put the newly created group in the "De-Registered Idle" state. If a new thread is created to manage the group, then the new thread will be initialized to the "De-Registered Idle" state.

The second ADN-AE uses the RMReadGroupList( ) API that is described above to read the list of groups that are managed by the RM in Step 3. The second ADN-AE may do this at startup before registering to any Service layer. The second ADN-AE will use the RM to find a service layer to register to. The second ADN-AE may simply use the set of API's to access the RM and it may be provisioned with a location that can be used to reach the RM or the address of the RM may be obtained by reading a well-known address.

After getting the group list, the second ADN-AE will use the RMReadGroupConfig( ) API to read the details of an existing group according to Step 4. The second ADN-AE will consider what other applications and services are part of the group, consider the group preferences, and consider the group triggers and make a decision about joining the group. This step may be executed multiple times for each group that the second ADN-AE would like to consider. Alternatively, the RMReadGroupConfig( )) API may be modified to support the possibility of providing the second ADN-AE with the configuration details of multiple groups.

The second ADN-AE will use the RMJoinGroup( ) API to join the group that was selected in the previous step in Step 5. The second ADN-AE will use the RMAddPreferences( ) API to indicate its preferences for the type of service layer that it would like to register with in Step 6. For example, the preferences may indicate that the second ADN-AE requires services such as data storage, semantics, data aggregation, etc. The preference may also indicate the link speed that is required for the service layer connection, the desired service layer owner (Service Provider), and the desired network owner.

The update to the group's preferences will cause the RM to transition the group from the "De-registered—Idle" state to the "De-Registered—Searching" state in Step 7. The RM will now begin searching for service layers that will be suitable to the group. In step 8, the RM may request that a Wi-Fi or cellular scan be initiated so that it can obtain an updated list of the Wi-Fi or cellular networks that are available.

In step 9, the RM will parse the list of available Wi-Fi networks and decide which networks it would like to perform service discovery in. In Step 10, The RM will request that the Wi-Fi modem connect to a specific Wi-Fi network. In Step 11, the RM will send a request to the service discovery service requesting that service discovery be performed in the current network. The service discovery request may contain the group's registration preferences or a subset of the group's registration preferences. Any discovered service layers that meet the group's registration preferences will be added to the group's available list.

Steps 10 and 11 will be repeated for a different network name as indicated by Steps 12 and 13. In Step 14, the group's available list is now complete and the RM will select a service layer from the Available List. The RM will stop looking for service layers.

The RM will use the RMRegisterCmd( ) API to command the ADN-AE's that belong to the group to register with the selected MN/IN-CSE in Step 15a/b. This step will occur one time for each ADN-AE that is part of the group. The ADN-AE's register with the MN/IN-CSE by sending a "Create <AE>" to the MN/IN-CSE in steps 16a/b. Once all group members have registered, the RM will transition the group to the "Registered—Normal Operation" state (Step 17)

In one embodiment, the RM service may be used by a device that supports a peer-to-peer communication framework such as AllJoyn. An AllJoyn announcement or broadcast may be used to initiate a new service discovery procedure. The announcement or broadcast may be considered a notification that there are new services available. Alternatively, the AllJoyn announcement or broadcast may be used as an indication that the device should connect to another device (i.e. the peer) and allow the peer device or an application running on the peer device to join an RM group.

Upon receiving an AllJoyn announcement or broadcast, the RM, or a Discovery Service that is associated with the RM, could use the AllJoyn About feature to discover what services, or features, are available on the peer device.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 2-3, 7, 8, 11-12 and 14. The computer executable instructions may be stored in a memory and executed by a processor disclosed above in FIGS. 1C and 1D, and employed in devices including servers, gateways and OneM2M device. In one embodiment, a computer-implemented UE having a non-transitory memory and processor operably coupled thereto, as described above in FIGS. 1C and 1D, is disclosed. Specifically, the non-transitory memory has instructions stored thereon for allocating control and coordination of the PSM. The processor is configured to perform the instructions of: (i) forming a registration group of one or more applications; (ii) receiving a request to join the registration group, from the one or more applications based upon a review of criteria; (iii) receiving a registration preference from the one or more applications; and (iv) performing service discovery on a network based upon the registration preference of the one or more applications in the registration group.

According to yet another embodiment, the non-transitory memory has instructions for (i) providing an event trigger received from one or more applications of a registration group; (ii) determining that the event trigger has occurred; (iii) requesting a scan of available networks; (iv) determining whether to perform service discovery; and (v) requesting service discovery to be performed on a network of the available networks according to a registration preference of the one or more applications.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A device comprising:
a non-transitory memory having instructions stored thereon for registering with a service layer; and
a processor, operably coupled to the memory, the processor configured to perform the instructions of:
forming a registration group of applications for registering with the service layer;
receiving a registration preference from one or more of the applications in the registration group; and
performing service discovery of the service on a network based upon the registration preference of the one or more applications in the registration group.

2. The device according to claim 1, wherein the processor is configured to request that the one or more applications pauses an existing service layer registration before performing service discovery.

3. A device comprising:
a non-transitory memory having instructions stored thereon for moving from an existing service layer to a new service layer; and
a processor, operably coupled to the memory, the processor configured to perform the instructions of:
providing an event trigger received from one or more applications of a registration group including the applications;
determining that the event trigger has occurred;
requesting a scan of available networks; and
requesting service discovery to be performed on a network of the available networks according to a registration preference of the one or more applications in the registration group.

4. The device according to claim 3, wherein the processor is configured to request that the one or more applications pauses the existing service layer registration before requesting service discovery.

5. The device according to claim 3, wherein the memory stores information of the registration group selected from a member list, available list of service layers, registration state, subscription, registration history, registration preference, event trigger, blacklist and combinations thereof.

6. The device according to claim 3, further comprising:
a graphical user interface;
a modem; and
a global positioning system.

7. The device according to claim 3, wherein the device is a mobile device, a server, a router and combinations thereof.

8. The device according to claim 3, wherein the processor is further configured to perform the instructions of:
building an available list of service layers for the registration group based upon the service discovery.

9. The device according to claim 3, wherein the processor is further configured to perform the instructions of:
selecting the new service layer from the available list; and
instructing the one or more applications in the registration group to register with the new service layer.

10. The device according to claim 3, wherein
the registration preference is selected from service layer name, service layer owner, network owner, registration cost, desired service, security requirement, communication protocol and combinations thereof.

11. The device according to claim 3, wherein the processor is further configured to perform the instructions of:
forming a subscription list for the registration group of a notification selected from: when further registration is required, when de-registration is required, when the available list is updated, when a new service layer matches the criteria and combinations thereof.

12. The device according to claim 3, wherein the processor is further configured to perform the instructions of:
creating a blacklist of services for the registration group.

13. The device according to claim 3, wherein the processor is further configured to perform the instructions of:
responding to an event trigger selected from an updated registration preference, service discovery completion, an updated available list, new service layer selected, de-registration, creation of a new event trigger, and combinations thereof.

14. A method for registering with a service layer comprising:
forming a registration group of applications for registering with the service layer;
receiving a request to join the registration group from one or more of the applications based upon a review of criteria;
receiving a registration preference from the one or more applications; and
performing service discovery for the service layer on a network based upon the received registration preference of the one or more applications in the registration group.

15. The method of claim 14, further comprising:
selecting the service layer from an available list; and
instructing the one or more applications in the registration group to register with the selected service layer.

16. The method of claim 14, further comprising:
forming a subscription list for the registration group of a notification selected from: when further registration is required, when de-registration is required, when the available list is updated, when a new service layer matches the criteria and combinations thereof.

17. The method of claim 14, further comprising:
creating a blacklist of services for the registration group; and
responding to an event trigger selected from an updated registration preference, service discovery completion, an updated available list, new service layer selected, de-registration, creation of a new event trigger, and combinations thereof.

18. A method for moving from a current service layer to a new service layer comprising:
providing an event trigger received from one or more applications of a registration group including the applications;
determining that the event trigger has occurred;
requesting a scan of available networks;
determining whether to perform service discovery; and
requesting service discovery to be performed on a network of the available networks according to a registration preference of the one or more applications in the registration group.

19. The method of claim 18, further comprising:
commanding a member of the registration group to pause current service layer registration;
instructing the one or more applications to refresh their service layer session with the current service layer; and
determining whether the new service layer is suitable for the registration group in view of the registration preference of the one or more applications.

20. The method of claim 18, further comprising:
instructing the one or more applications to de-register from the current service layer; and
instructing the one or more applications to pause their current service layer registration prior to scanning available networks.

\* \* \* \* \*